(12) United States Patent
Wu et al.

(10) Patent No.: US 11,196,900 B2
(45) Date of Patent: Dec. 7, 2021

(54) MULTI-HEADED ADJUSTABLE CAMERA

(71) Applicant: AVIGILON CORPORATION, Vancouver (CA)

(72) Inventors: Andrew L. P. Wu, Richmond (CA); Sudeep Mohan, Surrey (CA)

(73) Assignee: AVIGILON CORPORATION, Vancouver (CA)

( * ) Notice: Subject to any disclaimer, the term of this patent is extended or adjusted under 35 U.S.C. 154(b) by 651 days.

(21) Appl. No.: 14/982,737

(22) Filed: Dec. 29, 2015

(65) Prior Publication Data
US 2016/0191813 A1  Jun. 30, 2016

Related U.S. Application Data

(60) Provisional application No. 62/097,537, filed on Dec. 29, 2014.

(51) Int. Cl.
*H04N 5/225* (2006.01)

(52) U.S. Cl.
CPC ......... *H04N 5/2252* (2013.01); *H04N 5/2258* (2013.01); *H04N 5/2259* (2013.01)

(58) Field of Classification Search
CPC ... H04N 5/2252; H04N 5/2258; H04N 5/2259
USPC ......................................................... 348/159
See application file for complete search history.

(56) References Cited

U.S. PATENT DOCUMENTS

| | | | | |
|---|---|---|---|---|
| 8,973,505 B2* | 3/2015 | Hurd | ...................... | B61B 13/00 104/165 |
| 2004/0066564 A1* | 4/2004 | DiRisio | .................... | G02B 7/10 359/699 |
| 2005/0025472 A1* | 2/2005 | Sugita | .................... | G03B 17/14 396/71 |
| 2005/0057656 A1 | 3/2005 | Chardon et al. | | |
| 2007/0116458 A1* | 5/2007 | McCormack | ...... | G08B 13/1963 396/427 |
| 2009/0315288 A1* | 12/2009 | Hernandez | ............. | F16M 11/06 280/79.3 |
| 2011/0069148 A1 | 3/2011 | Jones et al. | | |
| 2013/0100292 A1* | 4/2013 | Mojaver | ................ | G03B 37/02 348/159 |

(Continued)

OTHER PUBLICATIONS

International Patent Application No. PCT/US2015/067916; Int'l Search Report; dated Apr. 1, 2016; 8 pages.

(Continued)

*Primary Examiner* — Sath V Perungavoor
*Assistant Examiner* — Kristin Dobbs

(57) ABSTRACT

A multi-headed camera assembly includes a base comprising a plurality of tracks, a plurality of image sensor assemblies each comprising a support mechanism configured to allow a quick and efficient assembly of a lens assembly within a housing and each removably coupled to the base by a corresponding support frame among a plurality of support frames. Each support frame comprises a guide member for guiding tilt movement of a corresponding image sensor assembly and a support base movably coupled to a corresponding track so as to accomplish pan movement of the corresponding image sensor assembly. The multi-headed camera assembly further includes a surface mount mechanism, an in-ceiling mount mechanism, or a pendant mount mechanism so that the multi-headed camera assembly can be removably mounted to a surface, mounted into a ceiling, or connected to a pendant base.

15 Claims, 23 Drawing Sheets

(56) References Cited

U.S. PATENT DOCUMENTS

2013/0147963 A1* 6/2013 Henninger, III .............................. G08B 13/19619
348/159
2015/0177596 A1* 6/2015 Bergsten .............. F16M 13/022
248/205.1
2015/0358538 A1* 12/2015 Donaldson ............. G03B 17/55
348/38

OTHER PUBLICATIONS

International Patent Application No. PCT/US2015/067916; Int'l Preliminary Report on Patentability; dated Jan. 13, 2017; 20 pages.

* cited by examiner

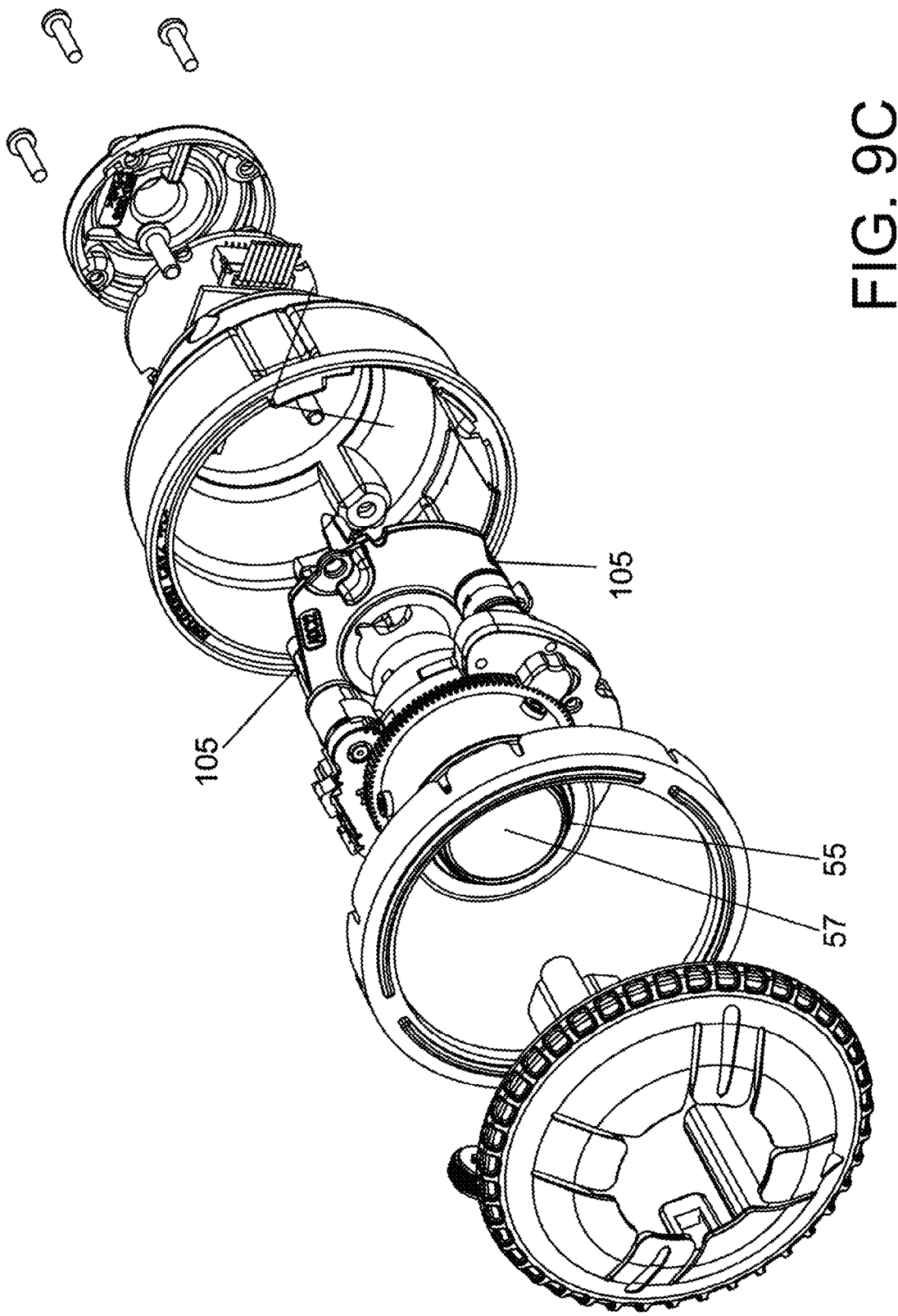

MULTI-HEADED ADJUSTABLE CAMERA

CROSS REFERENCE TO RELATED APPLICATIONS

This application claims benefit under 35 U.S.C. § 119(e) of Provisional U.S. Patent Application No. 62/097,537, filed Dec. 29, 2014, the contents of which is incorporated herein by reference in its entirety.

TECHNICAL FIELD

The present disclosure relates to a video-based surveillance apparatus, in particular, to a multi-headed adjustable camera assembly.

SUMMARY

The present disclosure is directed to at least a multi-headed camera assembly, a support apparatus, an image sensor apparatus, and a method of adjusting an image sensor apparatus.

A multi-headed camera assembly according to embodiments of the present disclosure includes a base comprising a plurality of tracks, a plurality of image sensor assemblies wherein each image sensor assembly comprises a support mechanism configured to allow a quick and efficient assembly of a lens assembly within a housing cover and each image sensor assembly is removably coupled to the base by a corresponding support frame, and a plurality of support frames wherein each support frame comprises a guide member for guiding tilt movement of a corresponding image sensor assembly and a support base movably coupled to a corresponding track so as to accomplish pan movement of the corresponding image sensor assembly.

An image sensor assembly support apparatus according to embodiments of the present disclosure includes a support base capable of moving along a track so as to accomplish pan movement of an image sensor assembly, a release member capable of releasing the support base so that the support base moves along the track and locking the support base at a desired position of the track, a pair of gimbals for rotatably receiving a ball joint of the image sensor assembly centrally there between, and a guide member for guiding tilt movement of the image sensor assembly.

An image sensor apparatus according to embodiments of the present disclosure includes a housing cover for receiving a lens assembly and a supporting mechanism configured to allow a quick and efficient assembly of the lens assembly within the housing cover. The housing cover comprises a front cover, a ring member, a middle cover, and a back cover wherein the ring member is rotatably attached to the back end of the front cover and the front end of the middle cover, the back cover is coupled to the middle cover by connecting to the support mechanism. The support mechanism comprises a receptacle for rotatably receiving the back end of the lens assembly, one or more positioning slots for receiving one or positioning projections provided inside the inner surface of the middle cover, one or more positioning holes for one or more fastening member to go through so as to fix the support mechanism to the front cover and the middle cover, and a plurality of positioning rods for receiving connecting members to fix the back cover to the support mechanism. The image sensor apparatus further comprises a self-applying pressure mechanism configured to hold the lens assembly in the supporting mechanism.

A method of adjusting an image sensor apparatus of a multi-headed camera assembly according to embodiments of the present disclosure includes a step of panning an image sensor assembly among a plurality of image sensor assemblies along a track among a plurality of tracks and a step of tilting the image sensor assembly along a guide member of the support frame. The step of panning further comprises steps of disengaging a release member of a support frame among a plurality of support frames from the track, moving the image sensor assembly side-to-side along the track to a desired position, and locking the image sensor assembly at the desired portion by engaging the release member with the track. The step of tilting the image sensor assembly along a guide member of the support further comprises steps of loosening a first connecting member of the support frame from a connecting portion of a ring member of the image sensor assembly, moving the image sensor assembly up-and-down along a guide groove of the guide member to a desired position, and locking the image sensor assembly at the desired position by tightening the first connecting member to the connecting portion of the ring member.

BRIEF DESCRIPTION OF THE DRAWINGS

Embodiments of the present disclosure will be described more fully hereinafter with reference to the accompanying drawings, in which:

FIGS. 9B, 9C and 9D are exploded perspective views of an image sensor assembly of a multi-headed camera assembly of the present disclosure;

DETAILED DESCRIPTION OF ILLUSTRATIVE EMBODIMENTS

Figure 1:
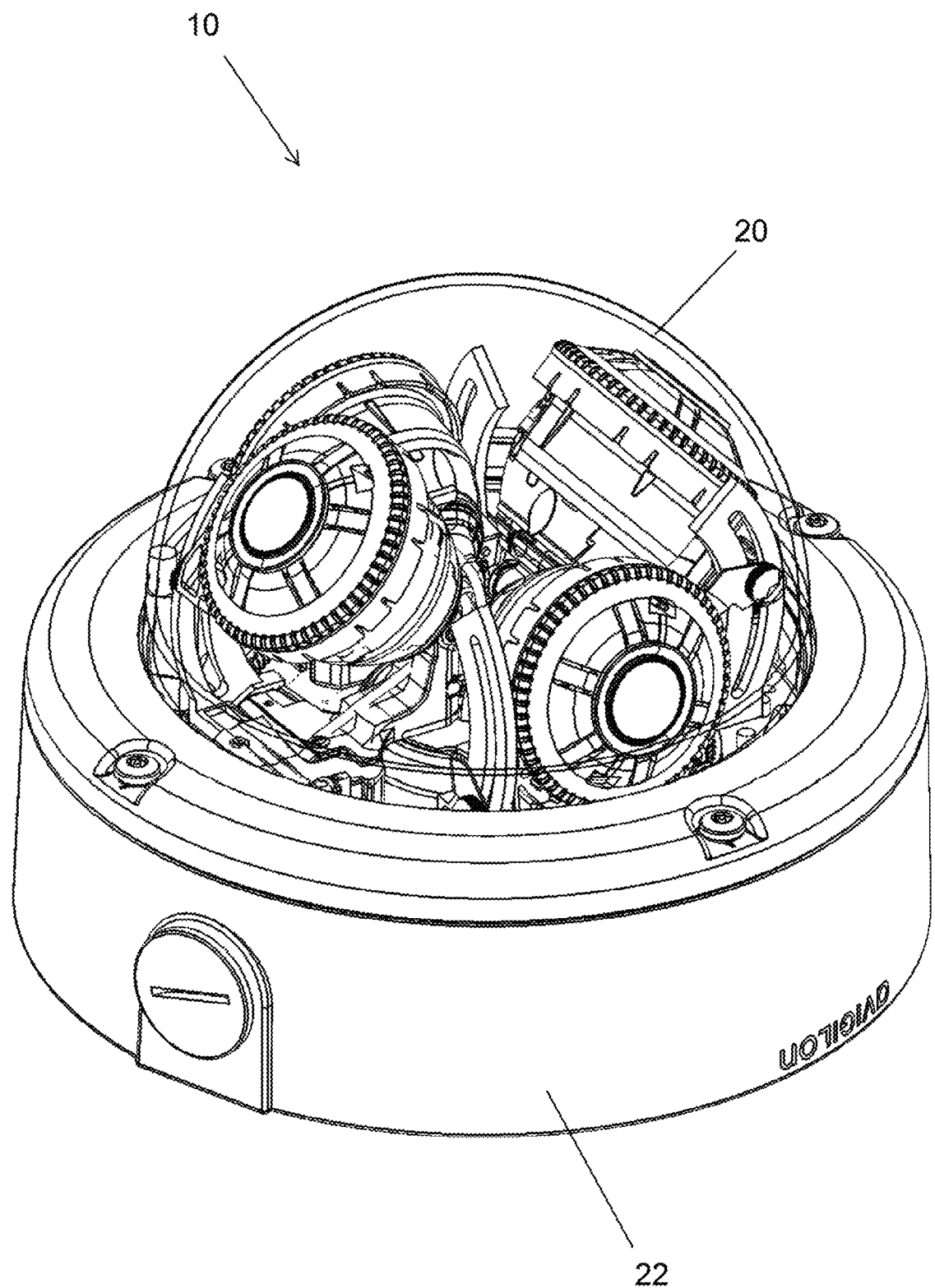
FIG. 1 is a perspective view of a multi-headed camera assembly in an inverted orientation in accordance with the present disclosure.
Figure 2:
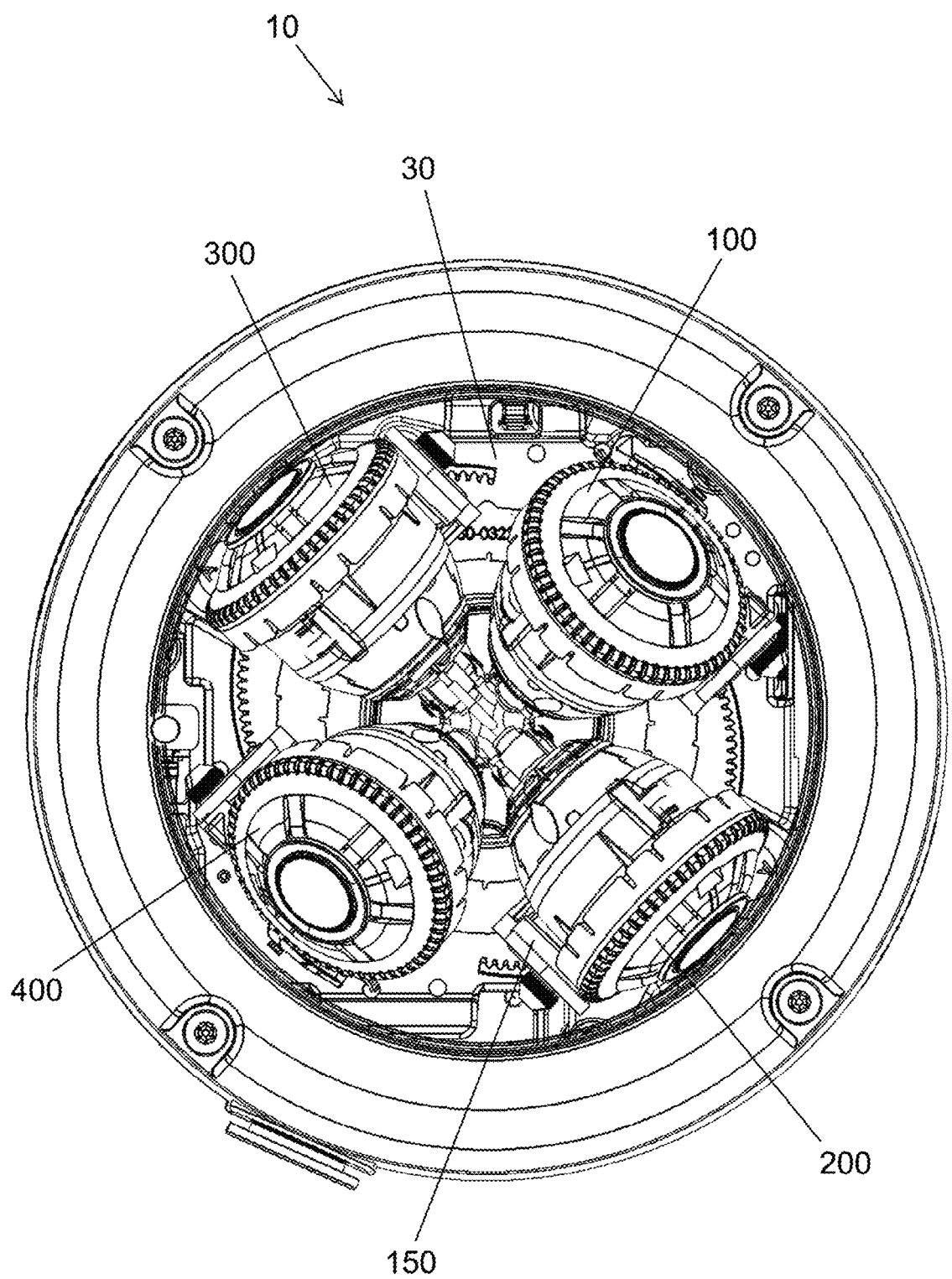
FIG. 2 is a top view of a multi-headed camera assembly of the present disclosure.

As shown in FIGS. 1 and 2, the multi-headed camera assembly 10 comprises a dome enclosure 20, a housing 22, a base 30, a first image sensor assembly 100, a second image sensor assembly 200, a third image sensor assembly 300, and a fourth image sensor assembly 400. The four image sensor assemblies are coupled to the base 30 by their corresponding support frame 150 (more fully shown in FIG. 6). The four image sensor assemblies are enclosed in the dome enclosure 20 and the housing 22. The dome enclosure 20 is comprised of a clear material, such as glass or plastic, so as to allow the image sensor assemblies to capture video through the dome 20 or is formed of a one-way material that allows the image sensor assemblies to capture video through the dome 20 without being visible from outside of the dome 20. The multi-headed camera assembly 10 may provide a 360° panoramic view without blind spots or may be purposely configured to have the image sensor assemblies view particular areas while not viewing others. The multi-headed camera assembly 10 is configured to give each image sensor assembly 100, 200, 300, or 400 the flexibility to pan, tilt and zoom as needed to configure the image sensor assemblies with the best view desired. While a four-headed camera assembly is illustrated in the drawings and described herein, it is to be understood that the number of image sensor assemblies is not limited to four image sensor assemblies and this figure is merely exemplary and does not limit the disclosure in any way. In particular, three image sensor assemblies may be supported in the same housing 22 and base 30 used to support four image sensor assemblies, and even a larger number of small image sensor assemblies could be supported in the same housing and base, or a larger one.

Figure 3A:
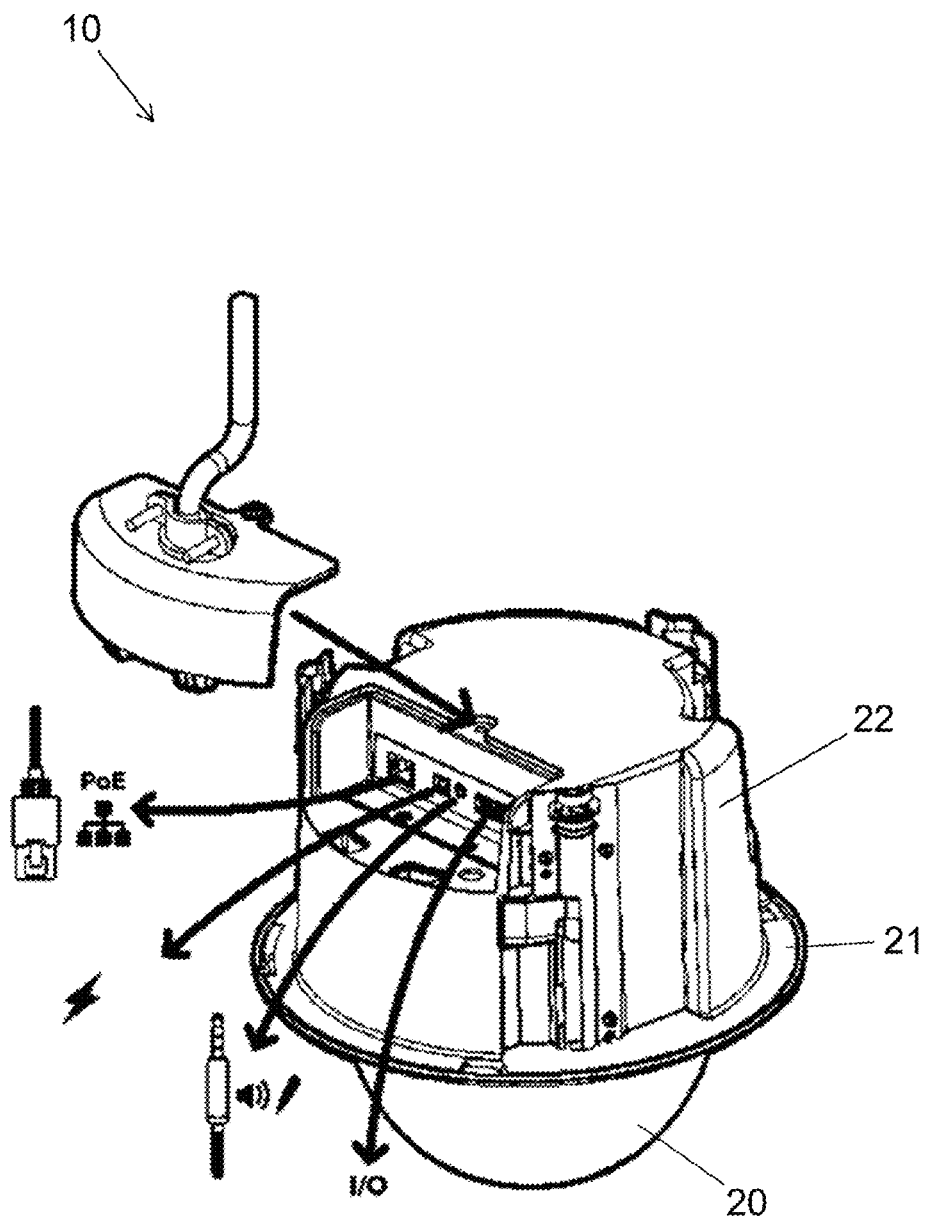
FIGS. 3A and 3B are perspective views of a multi-headed camera assembly with an in-ceiling mount mechanism.
Figure 3B:
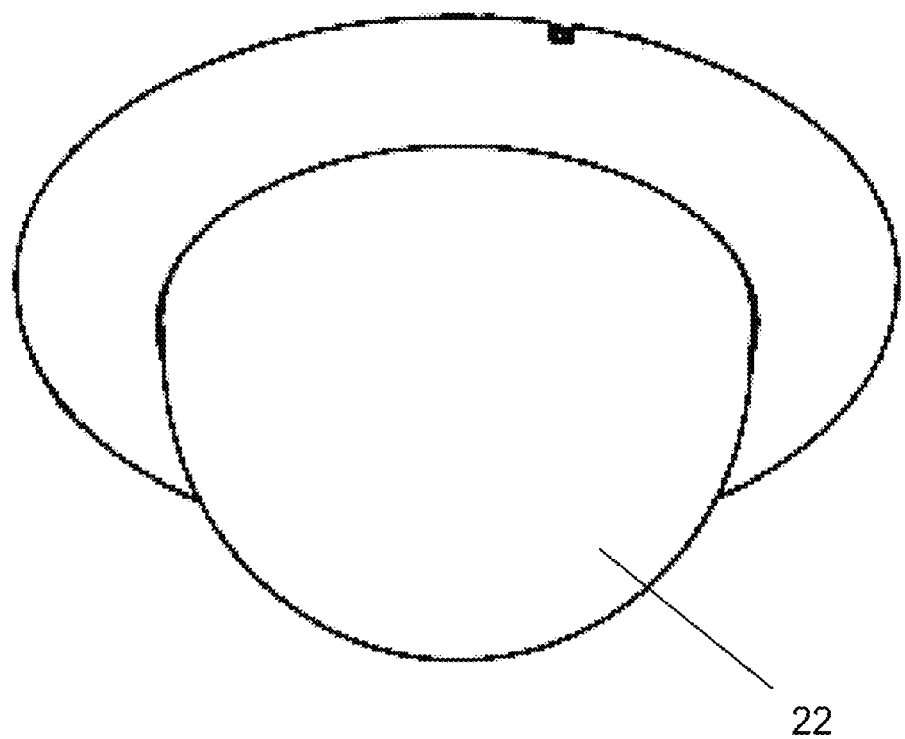
Figure 4A:
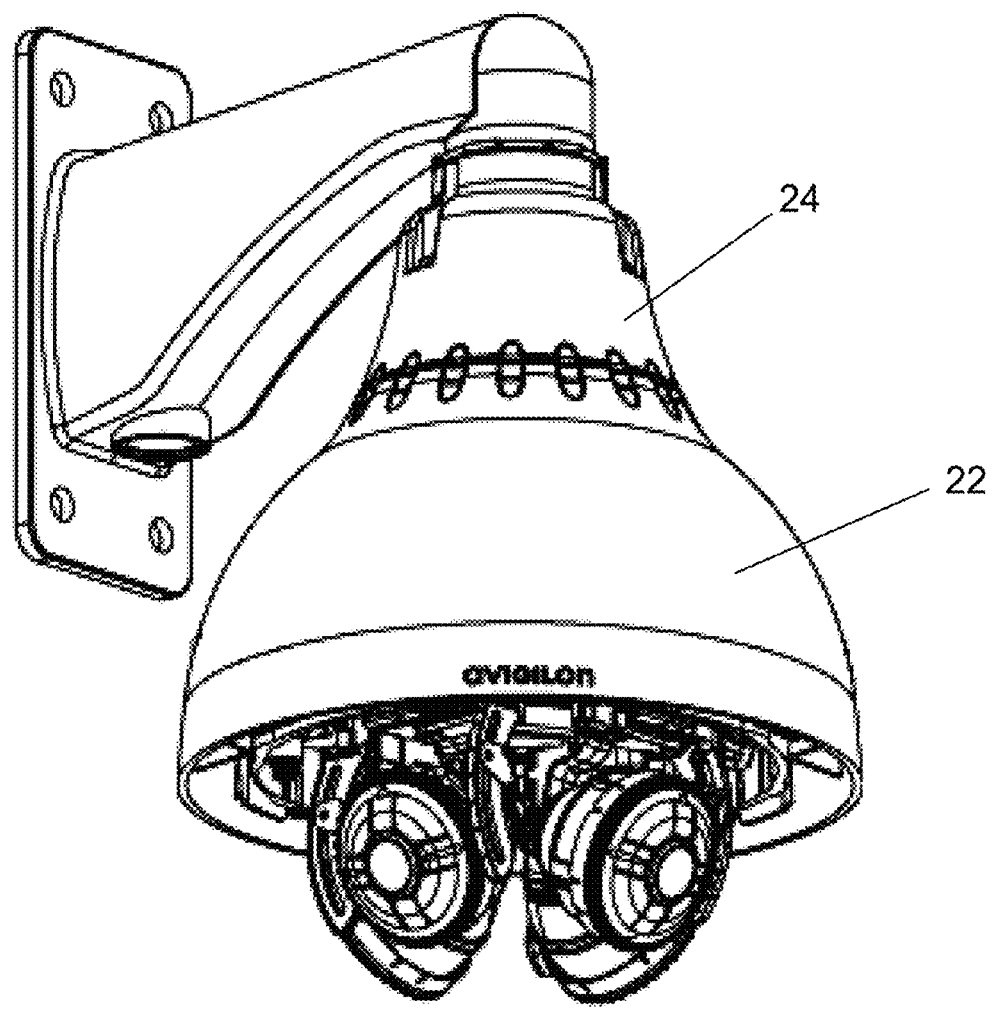
FIGS. 4A and 4B are perspective views of a multi-headed camera assembly with a pendant mount mechanism.
Figure 4B:
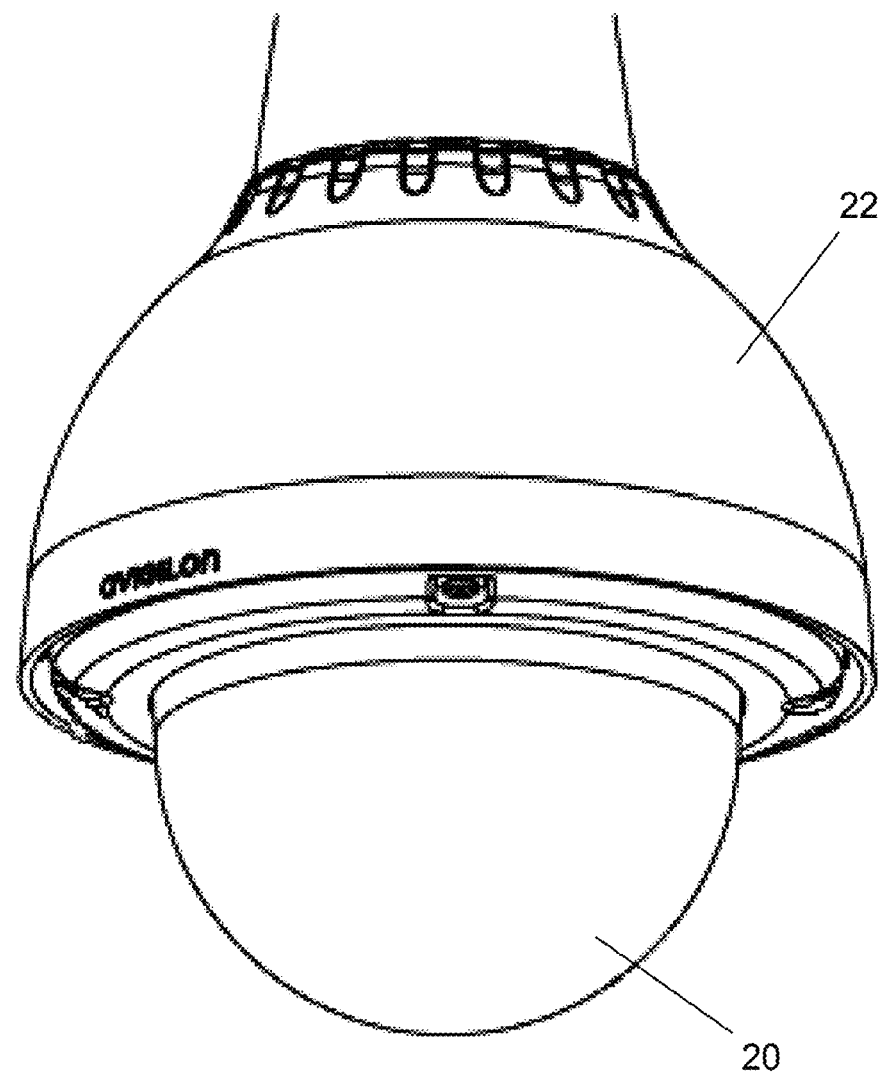

The housing 22 may have variant forms so as to mount the multi-headed camera assembly 10 to various places. For instance, the housing 22 may have a bottom surface so that the multi-headed camera assembly 10 may be inverted from the orientation shown in FIG. 1 and removably mounted to a surface. Alternatively, the housing 22 may be configured such that the multi-headed camera assembly 10 may be removably mounted into a ceiling, as shown in FIGS. 3A and 3B. When so mounted, the bulk of the housing 22 may be contained within the ceiling so that only the portion shown in FIG. 3B is visible from the ground. Wiring for the multi-headed camera assembly 10, such as a network connection, power, audio, and input/output wiring, may be hidden within the ceiling and routed to and connected to the camera assembly in a known fashion. In some embodiments, the housing 22 may be configured such that the multi-headed camera assembly 10 may be removably connected to a pendant base 24, as illustrated in FIGS. 4A and 4B.

Figure 5:
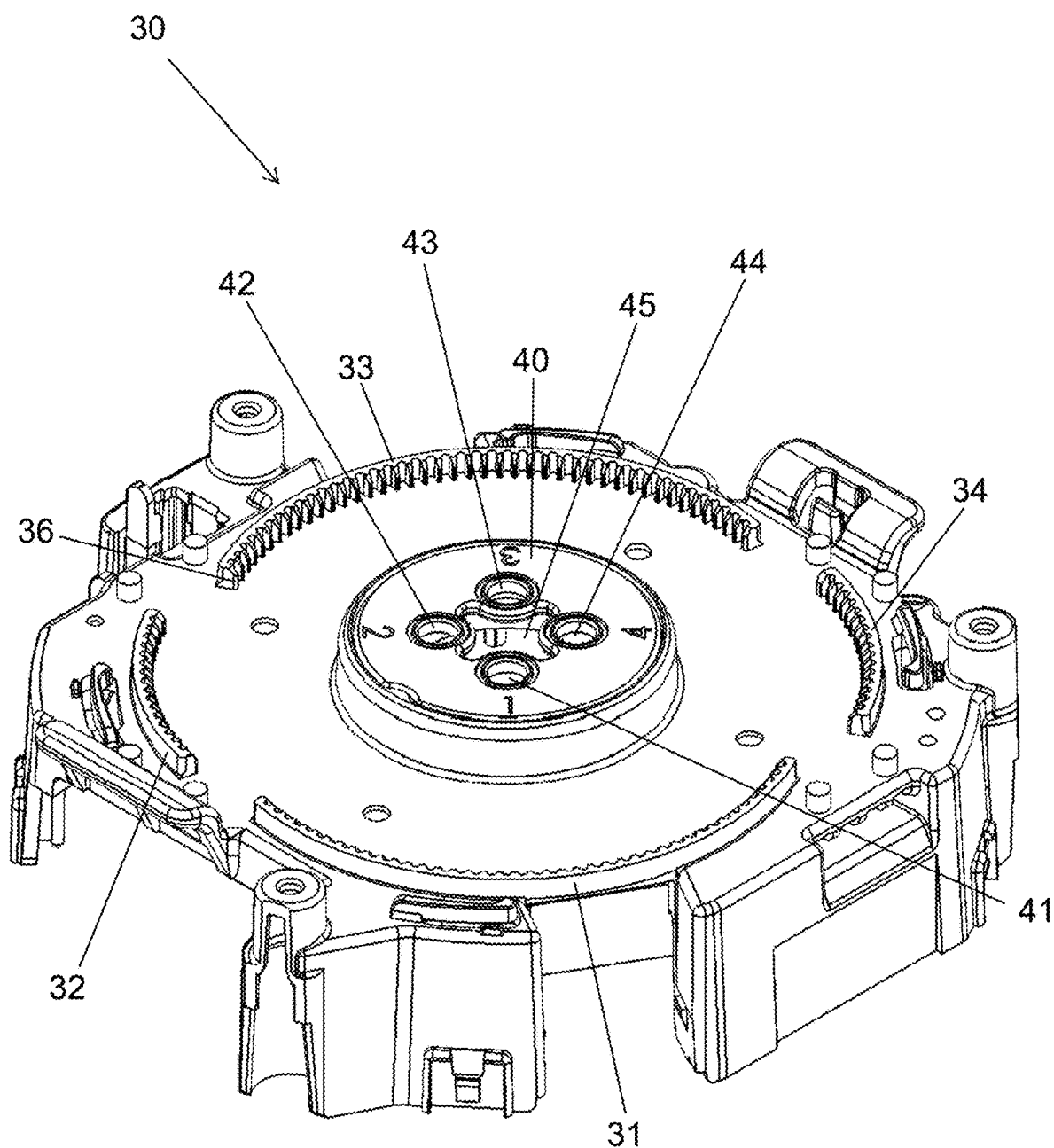
FIG. 5 is a perspective view of a base of a multi-headed camera assembly of the present disclosure.

FIG. 5 illustrates a perspective view of the base 30 of the multi-headed camera assembly 10. The base 30 may be made of any suitable material, such as plastic or metal. The base 30 includes a first long track 31, a second long track 33 substantially opposite the first long track 31, a first short track 32, a second short track 34 substantially opposite the first short track 34, and a platform 40. The tracks 31, 32, 33, or 34 provide a corresponding pan track for each image sensor assembly 100, 200, 300, or 400. As mentioned above, the number of image sensors of the present disclosure is not limited to four, so correspondingly, neither is the number of the aforementioned tracks so limited.

The tracks 31, 32, 33, and 34 may be arc-shaped, partially circular, or any other shape that will allow an image sensor to move along the tracks. They may be positioned adjacent to and follow along the outer circumference of the base 30, but need not form part of the same circle (the circles are figurative and are not shown in FIG. 5) within the circumference of the base 30. For example, as shown in FIG. 5, the short tracks 32 and 34 may lie upon one circle, while long tracks 31 and 33 may lie on another. Each of the tracks 31, 32, 33 and 34 may lie on a different circle. A plurality of track teeth 36 may be formed on each of the tracks 31, 32, 33, and 34. The plurality of track teeth 36 are configured and disposed so as to be capable of engaging with a plurality of teeth 195 formed on a release member 190, further detail below with reference to FIGS. 14 and 15.

Figure 6:
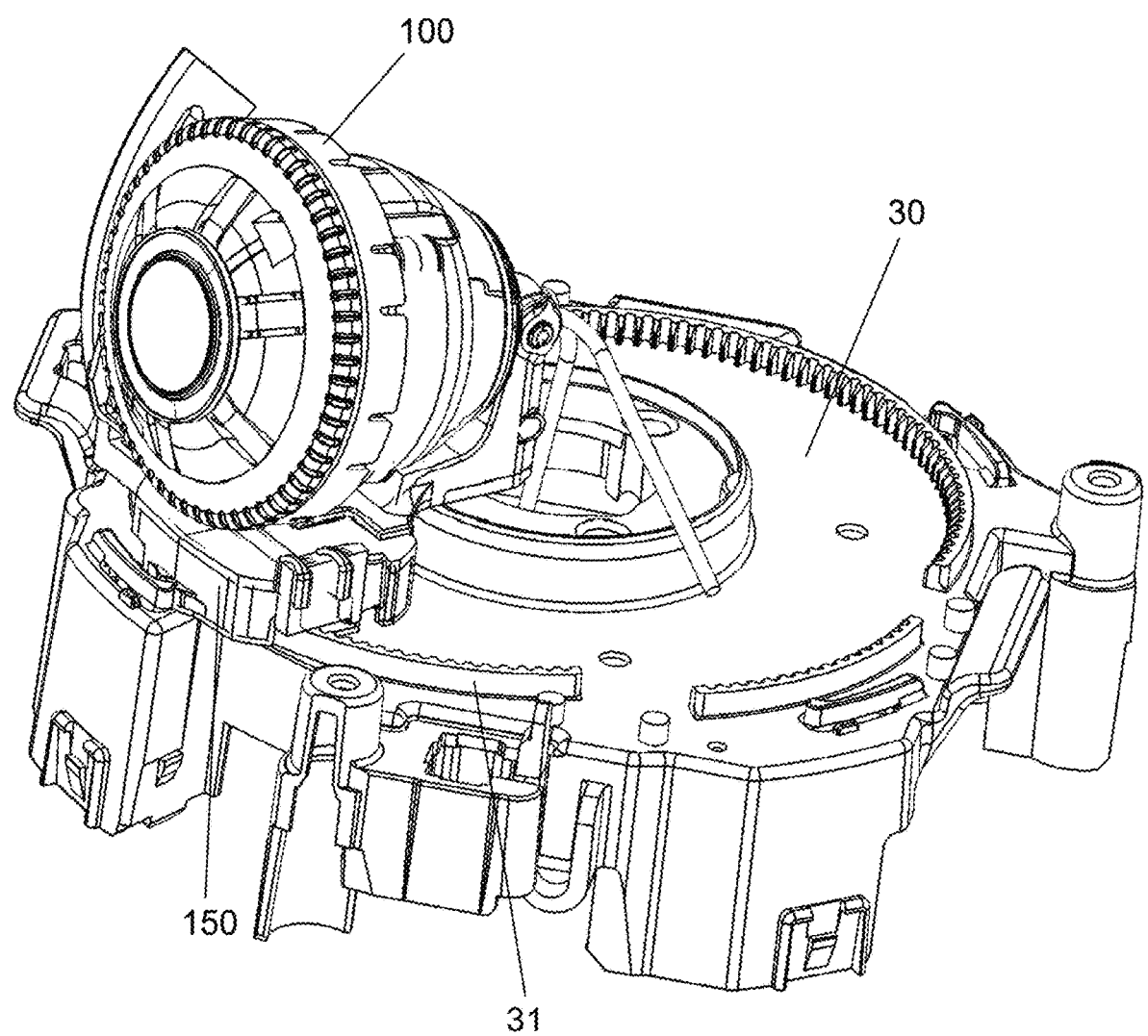
FIG. 6 is a perspective view of an image sensor assembly being coupled to a base of a multi-headed camera assembly by a corresponding support frame.

As illustrated in FIG. 6, a support frame 150 of the image sensor assembly 100 may be movably coupled to the long track 31. To simplify the Figures, only one image sensor assembly 100 will be illustrated in numerous of the Figures, but the same description applies to similar support frames of the other image sensor assemblies 200, 300 and 400 (not shown in FIG. 6 and other FIGS.), which may be coupled to each of the remaining tracks 31, 32, and 34, respectively, thereby enabling each image sensor assembly to pan from end to end of the corresponding track, i.e., partially rotate along the horizontal plan of the base 30. The uneven arrangement of the long tracks relative to the short tracks enables the two image sensor assemblies coupled to the long tracks to pan over a greater arc than the other two image sensor assemblies coupled to the short tracks, thereby enabling the multi-headed camera assembly 10 to meet various configurations.

The platform 40 of the base 30 may be raised to a certain height relative to the top surface of the base 30. The platform 40 may be circular and positioned at the center of the base 30. The platform 40 may include a central opening 45 and four holes 41, 42, 43, and 44 configured around the central opening 45. The holes 41, 42, 43, and 44 may be used to couple the support frames of the image sensor assemblies 100, 200, 300, 400, respectively, to the base 30. As mentioned above, the number of image sensor assemblies of the present disclosure is not limited to four, so correspondingly, the number of the aforementioned holes is not limited to four. The central opening 45 may be positioned at the center of the platform 40, but could be located elsewhere and is only referred to as the central opening herein for convenience. The central opening 45 allows the cables of the image sensor assemblies 100, 200, 300, and 400 to pass through the base to other portions of the housing 22. The four holes 41, 42, 43, and 44 may be positioned outside of the central opening 45 and evenly spaced apart from each other.

Figure 7:
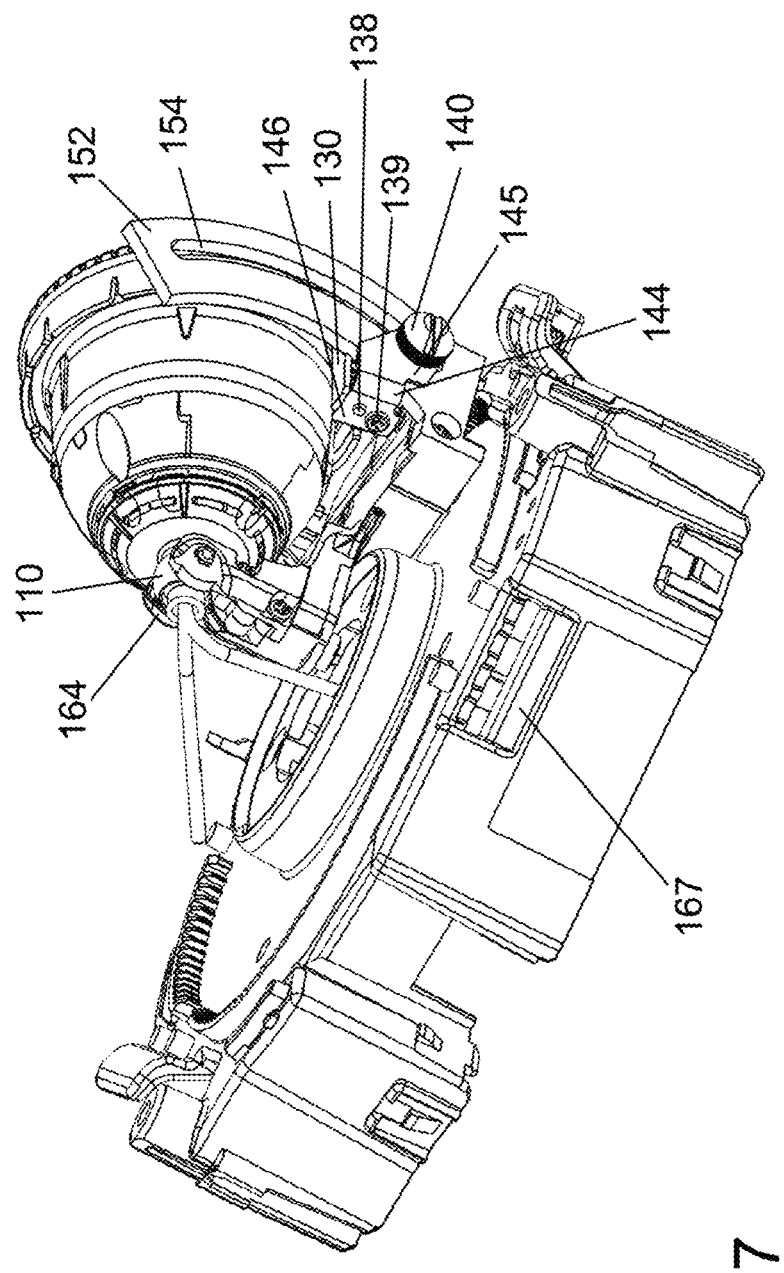
FIG. 7 is a second perspective view of the image sensor assembly of FIG. 6 being coupled to the base of the multi-headed camera assembly by a corresponding support frame.
Figure 8:
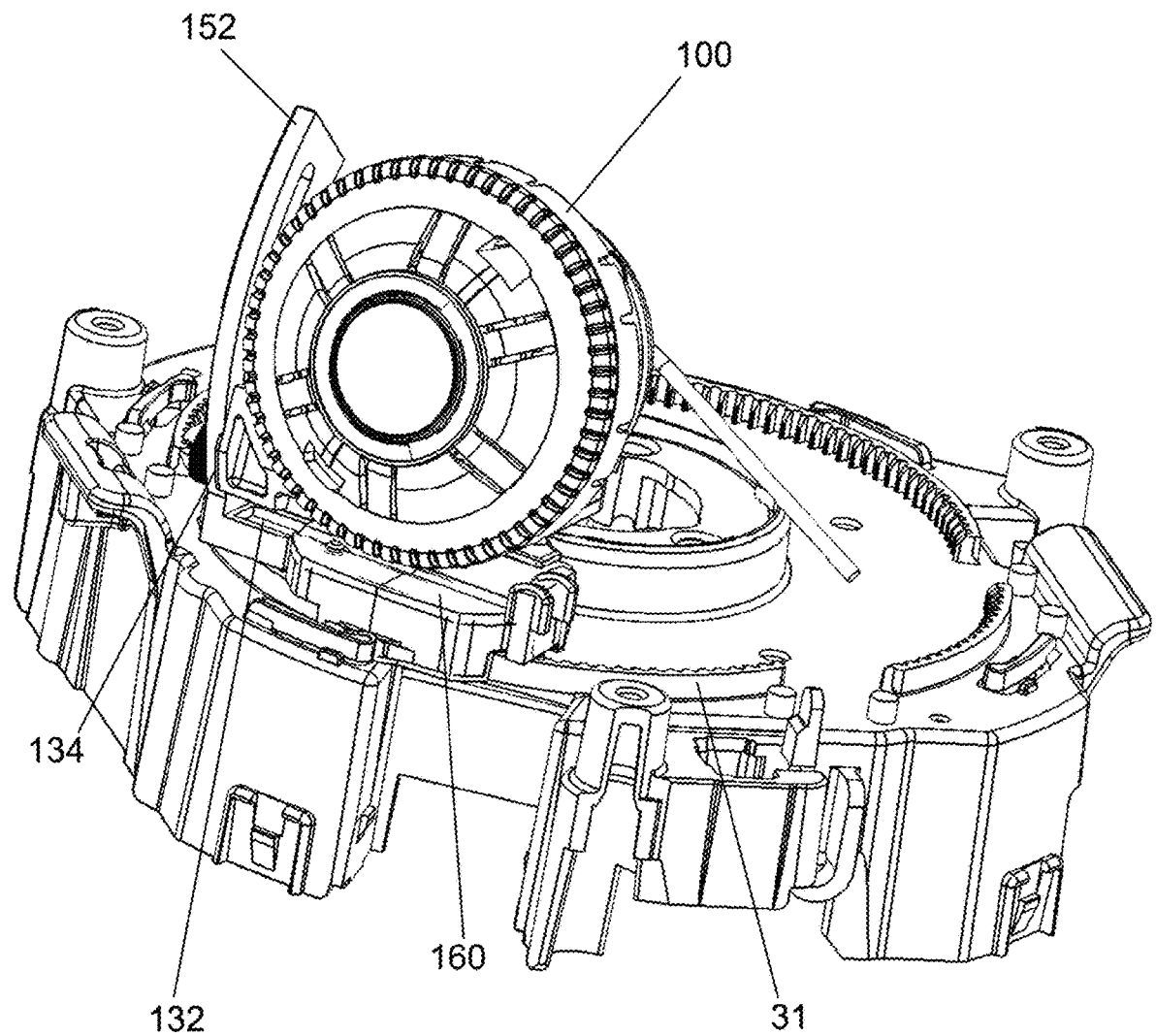
FIG. 8 is a third perspective view of the image sensor assembly of FIG. 6 being coupled to the base of the multi-headed camera assembly by a corresponding support frame.

As noted above, the four image sensor assemblies 100, 200, 300 and 400 and their corresponding support frames may have similar structures and may be coupled to the base 30 in a similar way. For convenience and simplicity, the following disclosure will only describe the first image sensor assembly 100, a corresponding support frame 150, and the connection relationship with the base 30, with the understanding that the same disclosure applies to the other image sensors and support frames and their connective relationship to the base 30. As illustrated in FIGS. 6, 7 and 8, and previously described, the image sensor assembly 100 may be coupled to the base 30 by the support frame 150, thereby allowing the image sensor assembly 100 to pan relative to the base 30 as the support frame 150 moves along the long track 31.

The support frame 150 may also enable the image sensor assembly 100 to tilt relative to the base 30. As illustrated in FIG. 7, the support frame 150 may include an arced guide member 152 that may be positioned at one side of the support frame 150 and approximately perpendicular to the base 30. The arced guide member 152 may extend upward from a support base 160 (shown in FIG. 8) of the support frame 150 and form a long arc from a lower end to an upper end. A guide groove 154 is formed in the guide member 152 so as to guide tilt movement of the image sensor assembly 100. The guide groove 154 may have an arced shape that substantially matches that of the guide member 152, i.e., longitudinally extending from a lower end to an upper end, but could be more arced at the upper end than at the lower end so as to enable at least one of the four image sensor to view an area perpendicular or almost perpendicular to the plane of the base 30.

The length of the guide member 152 may be arranged according to a desired tilt range of the image sensor assembly 100. For instance, the guide member 152 may be configured to allow the image sensor assembly 100 to tilt up to about 65° from the horizon or as much as up to about 90°. A corresponding guide member of another image sensor assembly 200, 300, or 400 may have a length that is the same as or different from the length of the guide member 152. Preferably, a guide member among a plurality of guide members, such as the guide member 152, has an extended length (as shown in FIG. 11B) so as to allow a corresponding image sensor assembly, such as the image sensor assembly 100, among a plurality of image sensor assemblies to tilt up to 90°; the rest of the guide members among the plurality of guide members may each have a regular length that allows a corresponding image sensor assembly to tilt up to about 65° or any other degree less than 90°.

Figure 13:
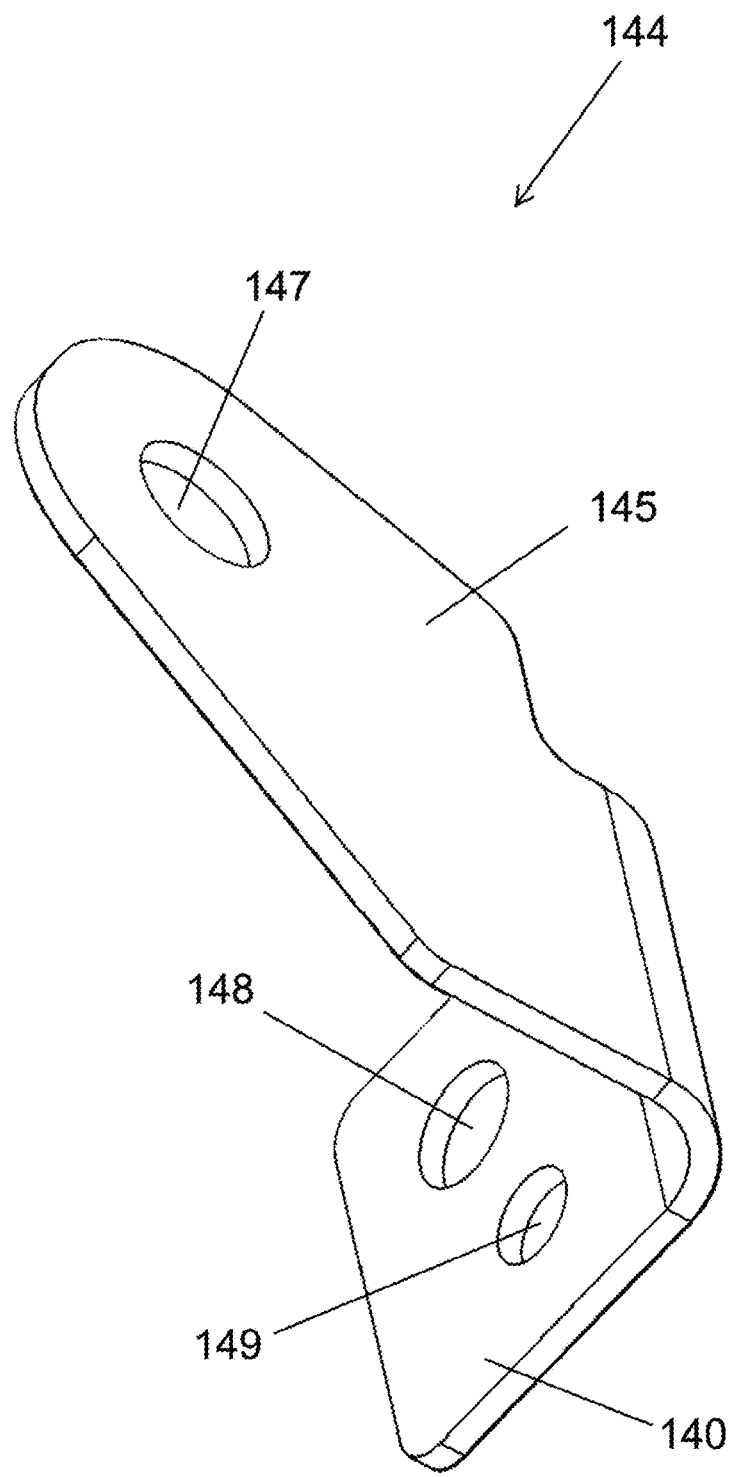
FIG. 13 is a perspective view of a connecting member for connecting a guide member to an azimuth ring of an image sensor assembly of a multi-headed camera assembly of the present disclosure.

The image sensor assembly 100 may be movably coupled to the guide member 152 by a connecting portion 130, which is part of an azimuth ring 120, as further described below with reference to FIGS. 9, 10A and 10B, a connecting piece 140, and a connecting member 144. The connecting piece 140 may go through, as shown in FIG. 13, a hole 147 formed in a first wing 145 of the connecting member 144, the guide groove 154, and into a first threaded hole 136 formed in the connecting portion 130 (as shown in FIGS. 10A and 10B). In use, a user can loosen the connecting piece 140 so as to tilt the first camera assembly 100 relative to the base 30 along the guide groove 154 up to a desired position, such as 65° from the horizon. When the image sensor assembly 100 is tilted to a desired position, the user can tighten the connecting piece 140 so as to lock the image sensor assembly 100 against further movement. Other elements of FIGS. 7 and 8 are further described below with reference to FIGS. 9, 10A and 10B. It should be appreciated that the manner by which the image sensor assembly 100 is coupled to the guide member 152 described herein is merely illustrative, and any other suitable means capable of movably coupling the image sensor assembly 100 to the guide member 152 may be used in the present disclosure.

Figure 9A:
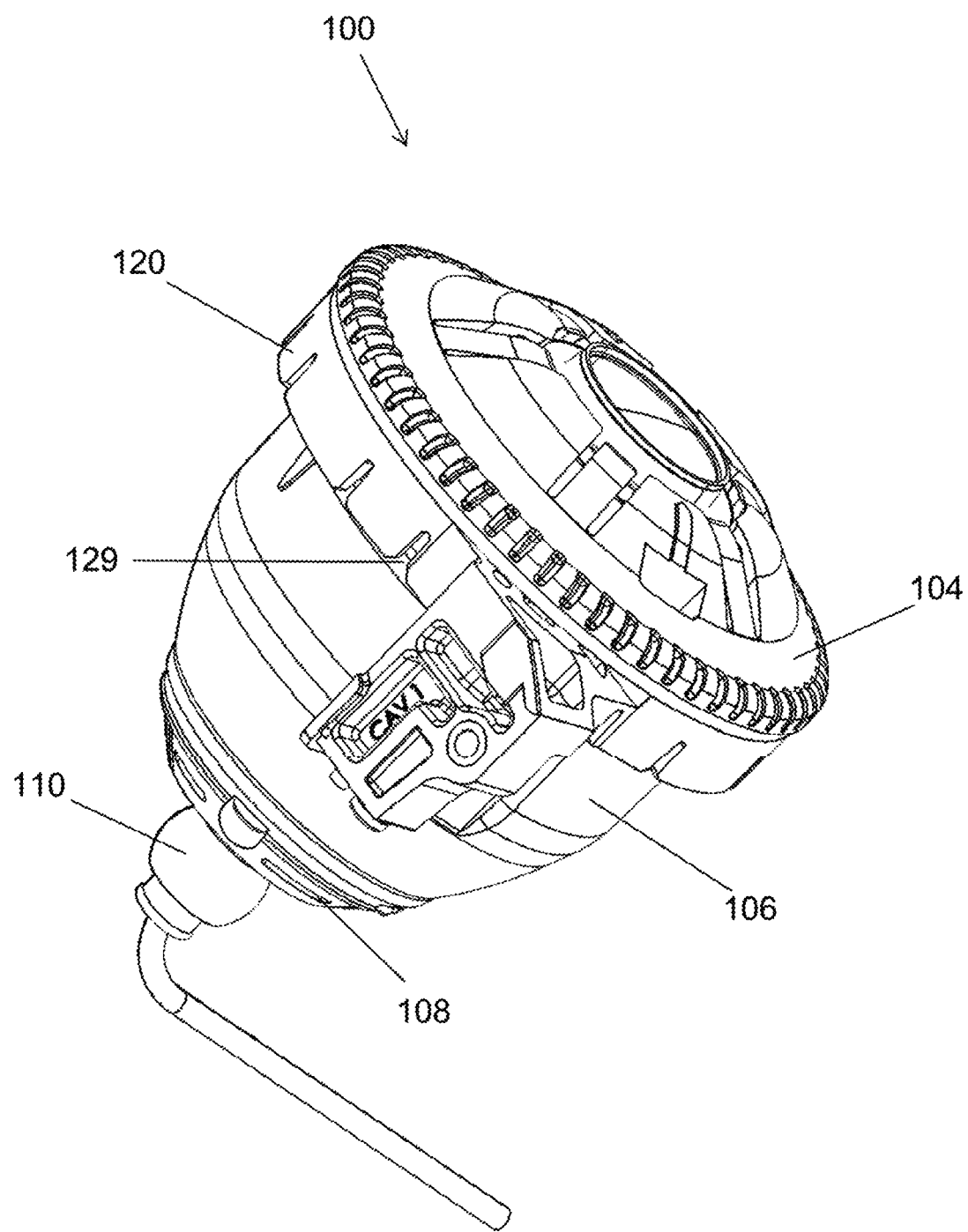
FIG. 9A is a perspective view of an image sensor assembly of a multi-headed camera assembly of the present disclosure.
Figure 10A:
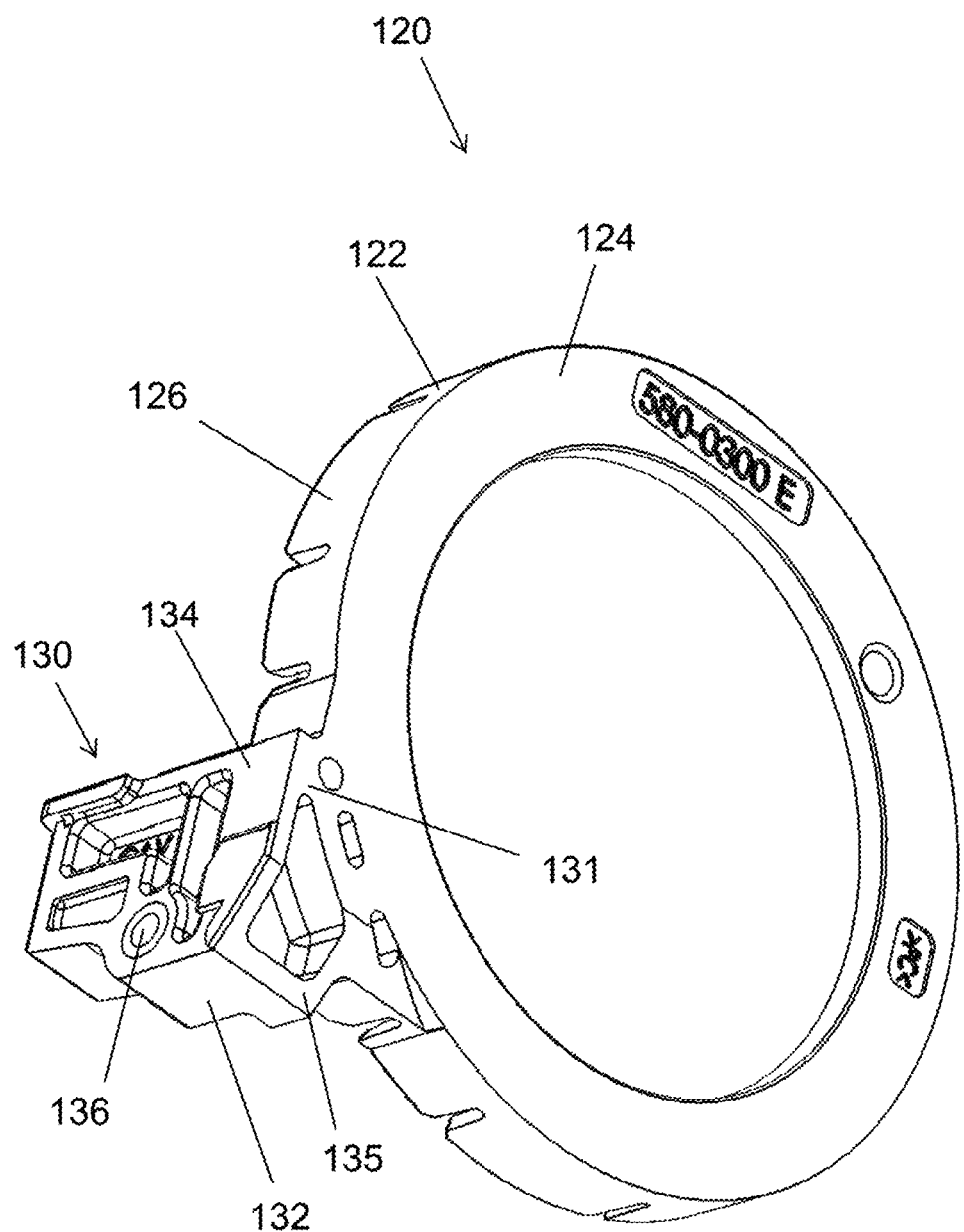
FIGS. 10A and 10B are perspective views of an azimuth ring of an image sensor assembly of a multi-headed camera assembly of the present disclosure.
Figure 10B:
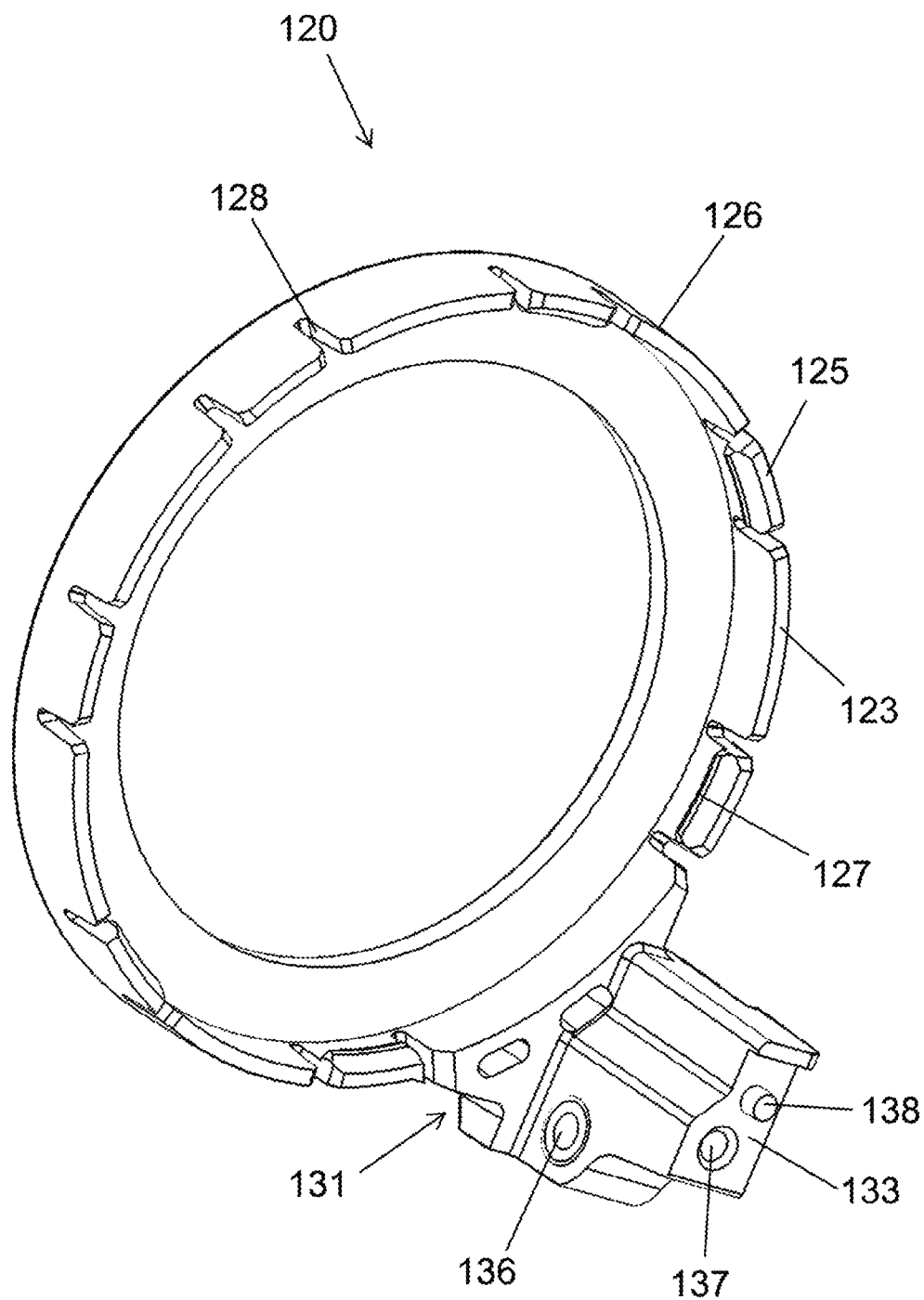

FIG. 9A illustrates a perspective view of the image sensor assembly 100 in accordance with an embodiment of the present disclosure. The image sensor assembly 100 may comprise a lens assembly 57 (shown in FIG. 9C), a front cover 104, a middle cover 106, a back cover 108, and the azimuth ring 120. The lens assembly 57 may include a zoom lens and a corresponding mechanism for varying the focal length of the zoom lens. The image sensor assembly 100 may be disposed in the dome enclosure 20 so as to allow the lens assembly 57 to freely zoom in or out to its maximum focal length. The front cover 104, the azimuth ring 120, the middle cover 106, and the back cover 108 may be made of any suitable material, such as plastic. The front cover 104, the azimuth ring 120, the middle cover 106, and the back cover 108 are capable of being attached to each other, respectively.

Figure 9B:
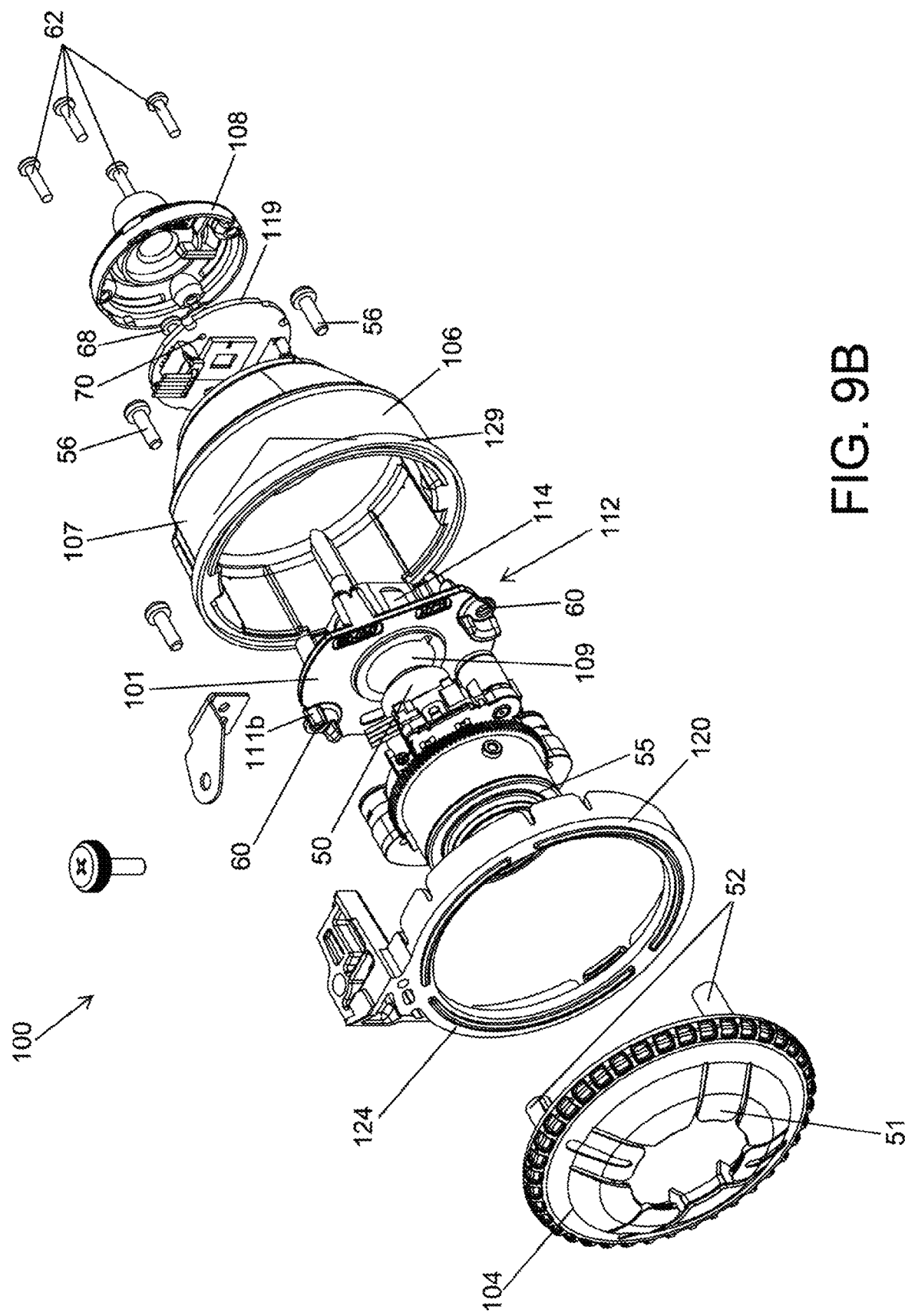
Figure 9D:
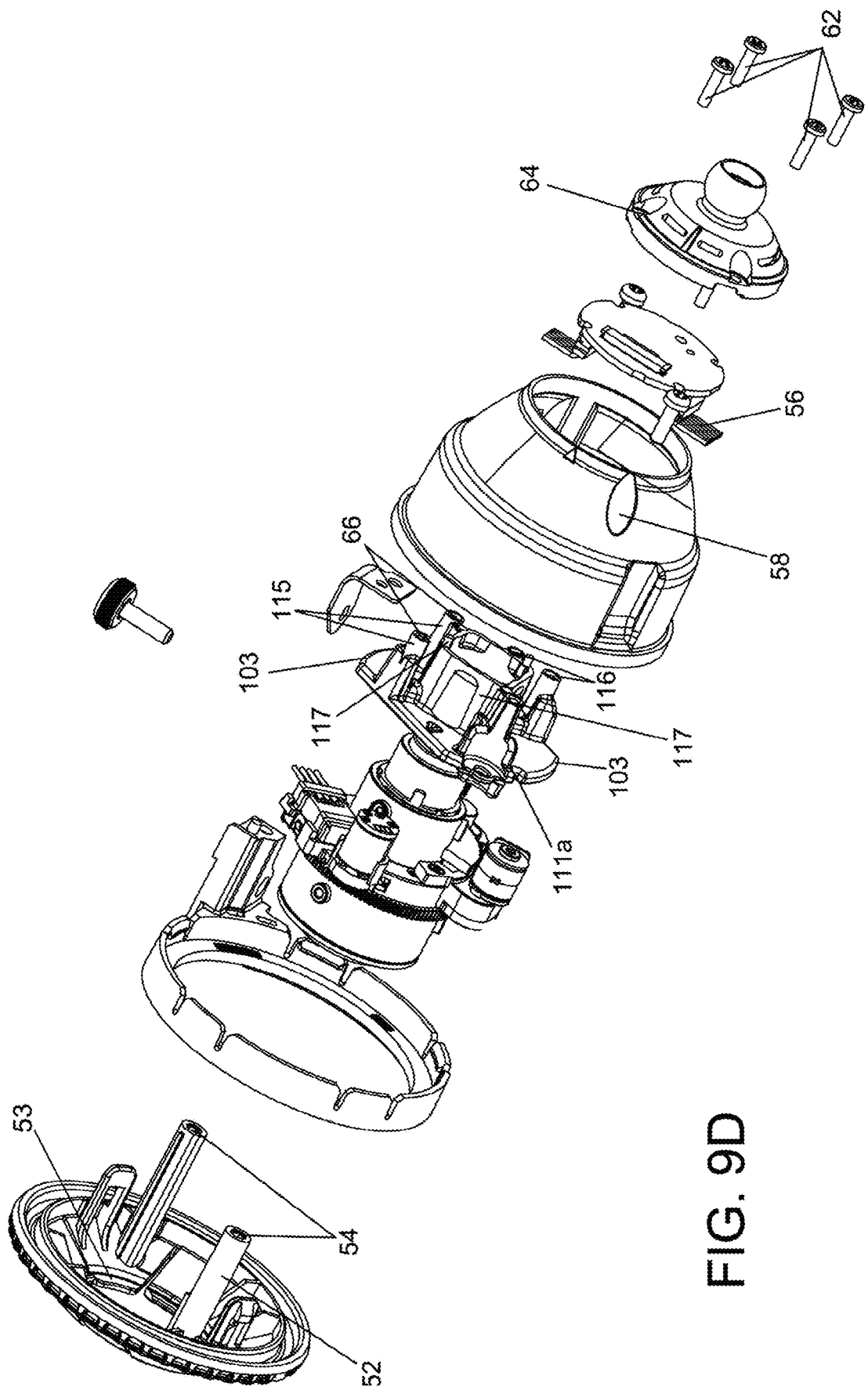

In one embodiment as illustrated in FIGS. 9B, 9C and 9D, the image sensor assembly 100 further comprises a support mechanism 112 which allows a quick and efficient assembly of the lens assembly 57 within the middle cover 106. The support mechanism 112 may be made of any suitable material, such as metal and plastic. A cylindrical back end 50 of the lens assembly 57 may rotatably fit into a cylindrical hole 109 formed approximately at the center of the support mechanism 112. The support mechanism 112 is configured to fit into the middle cover 106. The azimuth ring 120 may be rotatably attached to the front end of the middle cover 106, and the front cover 104 may be rotatably attached to a front section 124 of the azimuth ring 120.

In an example, the front cover 104 comprises a plurality of griping members 51 for holding the lens assembly 57 in the support mechanism 112. The plurality of griping members 51 may be separated from each other by narrow slots, and be arranged such that a circular opening for receiving the lens or set of lens of the lens assembly 57 is formed at the center of the front cover 104. A plurality of ridges 53 are formed on the back surfaces of the plurality of griping members 51, respectively. The plurality of ridges 53 may be positioned and configured so as to fit into an annular groove 55 formed around a front end of the lens 57 of the lens assembly 57 and evenly apply pressure to the bottom surface of the annular groove 55.

The plurality of ridges 53 may be arc-shaped and partially circular. Preferably, the plurality of ridges 53 may be formed approximately along a common circle. A snap-fit arrangement consisting of the ridges 53 and the annular groove 55 is advantageous because there is no interference with the lens 57 of the lens assembly 57 being able to zoom in or out. This arrangement also eliminates the inconvenience of needing to use a screwdriver or similar tool or one's fingers to fix the lens assembly 57 in place, which might be required if a drill chuck type of mechanism was used instead. The arrangement further applies even pressure to hold the lens assembly 57 in place and reduces the risk of skewing alignment of the lens assembly 57 relative to the support mechanism 112 due to other types of arrangements, such as a set screw. It should be appreciated that the snap-fit arrangement consisting of the ridges 53 and the annular groove 55 is merely illustrative, and that any other suitable configuration capable of self-applying even pressure to hold the lens assembly 57 in place may be used and remain consistent with the present disclosure.

The front cover 104 may further include a pair of positioning bars 52 that are positioned opposite each other. Two threaded holes 54 may be formed inside the pair of positioning bars 52, respectively. The two positioning bars 52 are used to connect the front cover 104 to the support mechanism 112 and the middle cover 106 by screwing a pair of screws 56 through a pair of holes 58 provided in the middle cover 106 and another pair of holes 60 provided in the support mechanism 112 and further into the two threaded holes 54 of the positioning bars 52 of the front cover 104.

As shown in FIGS. 9B, 9C and 9D, the support mechanism 112 may include a plate section 101 and a column section 114. The periphery of the plate section 101 may consist of two opposite circular portions 103 and two opposite non-circular portions 105. The circular portions 103 may be shaped so as to fit within the circular inner surface of the upper portion 107 of the middle cover 106. The non-circular portions 105 may be shaped such that when the support mechanism 112 is assembled within the middle cover 106, a certain space may be formed between the non-circular portions 105 and the inner surface of the middle cover 106 so as to allow the wiring cable of the lens assembly 57 pass through the space. In order to facilitate orientation of the support mechanism 112 within the middle cover 106, the two non-circular portions 105 may have different peripheral shapes, such as one portion being straight and the other being slightly curved.

The pair of holes 60 for connecting the support mechanism 112 to the front cover 104 and the middle cover 106 may be provided in the plate section 101 and may be positioned opposite to one another and adjacent to the two circular edges 103. A pair of positioning slots 111a and 111b may be formed adjacent to the pair of holes 60, respectively. The pair of positioning slots 111a and 111b may receive a pair of positioning projections (not shown) provided inside the inner surface of the middle cover 106 so as to prevent the support mechanism 112 from rotating relative to the middle cover 106. As described above, the cylindrical hole 109 for rotatably receiving the back end of the lens assembly 57 may be formed at the approximately center of the support mechanism 112. The cylindrical hole 109 may extend through the plate section 101 and the column section 114. The column portion 114 may include a positioning threaded hole 116 that is used to fix a circuit board 119 to the support mechanism 112 by screwing a screw 68 through a hole (not shown) formed on the circuit board 119 and further into the positioning threaded hole 116. The circuit board 119 may comprise an image sensor component for gathering light. The column portion 114 may further include one or more thin positioning rods 117 for inserting into one or more holes 70 formed in the circuit board 119. The column portion 114 may further include a plurality of positioning rods 115, four of which are shown, with only two identified to not overly clutter the Figure. A plurality of threaded holes 66 may be formed in the plurality of positioning rods 115, respectively. The positioning rods 115 may be used to connect the support mechanism 112 to the back cover 108 by screwing a plurality of screws 62 through a corresponding number of holes 64 formed in the back cover 108 and further into the plurality of threaded holes 66, respectively.

A ball joint 110 may be formed at the back end of the back cover 108. The ball joint 110 may be partially hollow so as to allow the wiring cable of the lens assembly 57 to go through the ball joint 110. As shown more particularly in FIG. 7, the ball joint 110 may be positioned centrally between a pair of gimbals 164 formed at the back end of the support frame 150. The ball joint 110 may rotate within the pair of gimbals 164, thereby allowing the image sensor assembly 100 to tilt up and down. As further described below, the support frame 150 may be further movably coupled to hole 41 to enable the image sensor assembly 100 to pan.

As shown in FIGS. 10A and 10B, the azimuth ring 120 may include a ring portion 122 and a connecting portion 130. The ring portion 122 and the connecting portion 130 may be formed as one piece. The properties of the connecting portion 130 will be described in further detail below. The ring portion 122 may include a front section 124 and a side wall 126. The front section 124 may be ring-shaped. The side wall 126 may be positioned approximately perpendicular to the front section 124. As noted, the front section 124 of the azimuth ring 120 may fit between the middle cover 106 and the front cover 104. The side wall 126 may be disposed outside the front end of the middle cover 106. As illustrated in FIG. 10B, the azimuth ring 120 may further include a number of first tabs 123 and second tabs 125 with locks 127. The tabs 123 and 125 may be formed around the azimuth ring 120 by the slots 128. The locks 127 of the second tabs 125 may slip over an extended ring 129 (shown in FIG. 9B) formed at the front end of the middle cover 106 to hold the azimuth ring 120 in place.

The connecting portion 130 of the azimuth ring 120 may include a front surface 131, a bottom surface 132, a side surface 134, a back surface 133, and a backward-sloped surface 135 formed between the front surface 131 and the bottom surface 132. The side surface 134 may be approximately perpendicular to the bottom surface 132. As illustrated in FIGS. 7 and 8, the side surface 134 and the bottom surface 132 may fit the lower end of the guide member 152 and the support base 160, respectively, when the image sensor assembly 100 is positioned at the horizon.

A first threaded hole 136 may be formed in the connecting portion 130 perpendicular to the side surface 134 and perpendicularly inwardly extending to the opposite side of the connecting portion 130. The first threaded hole 136 may be configured and disposed such that it is capable of receiving the connecting piece 140 of FIG. 7. A second threaded hole 137 may be formed in the connecting portion 130, being perpendicular to the back surface 133 and perpendicularly extending toward the front surface 131. The second threaded hole 137 may be configured and disposed to receive a second connecting piece 139 that connects a second wing 146 of the connecting member 144 to the back surface 133 of the connecting portion 130, as shown in FIG. 7. A positioning rod 138 may be perpendicularly formed on the back surface 133. The positioning rod 138 may be used to position the second wing 146 of the connecting member 144 relative to the back surface 133 of the connecting portion 130.

By way of example and without limitation, the connecting piece 140 may be a screw with a relatively large and textured head that allows a user to conveniently rotate the screw so as to loosen or tighten the connecting piece 140. The screw may include a threaded rod which is long enough to go through the first hole 147 formed in the first wing 145 of the connecting member 144, the guide groove 154, and into the first threaded hole 136 of the connecting portion 130 up to a certain depth.

Figure 11A:
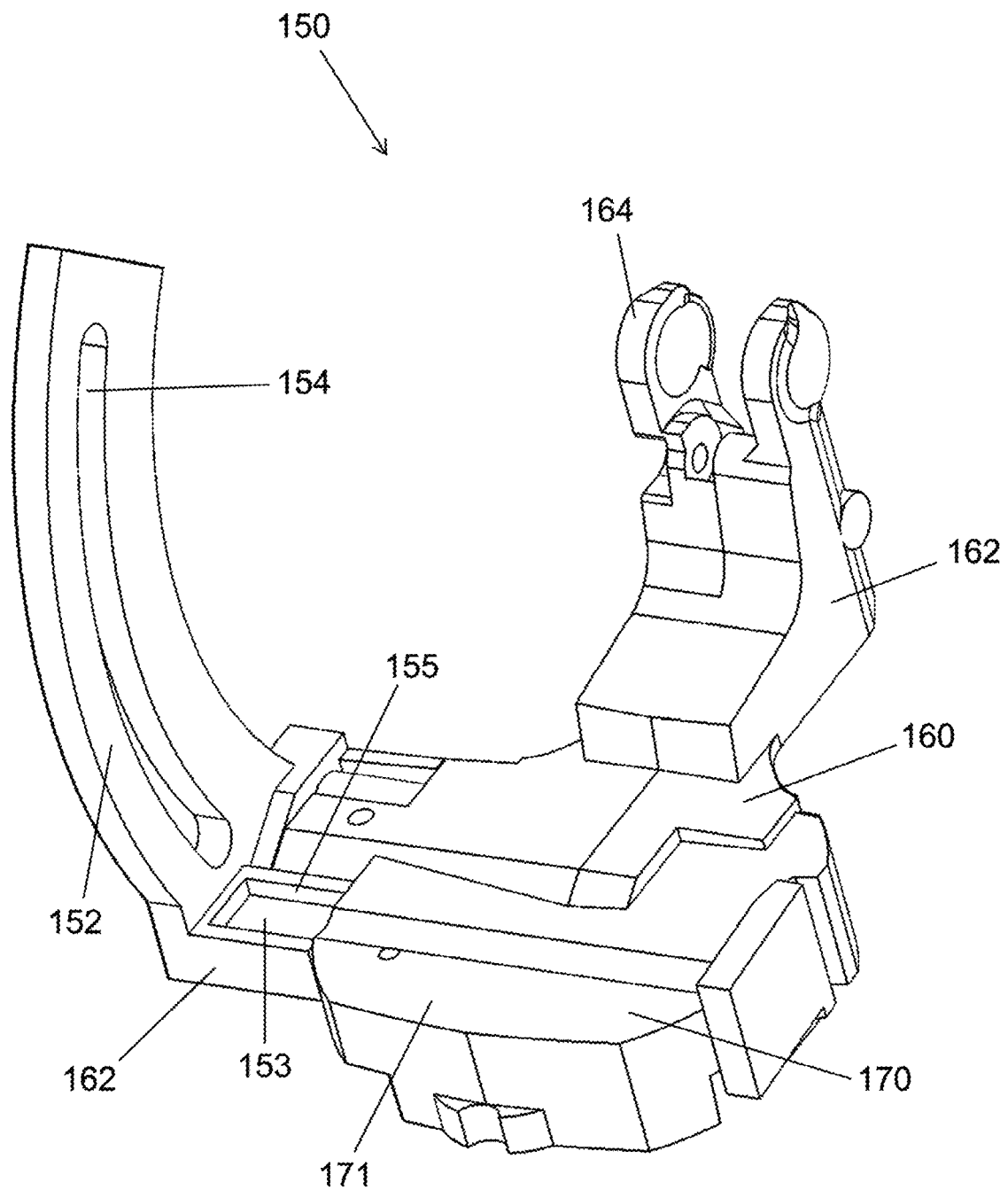
FIG. 11A is a perspective view of a support frame of an image sensor assembly of a multi-headed camera assembly of the present disclosure.
Figure 11B:
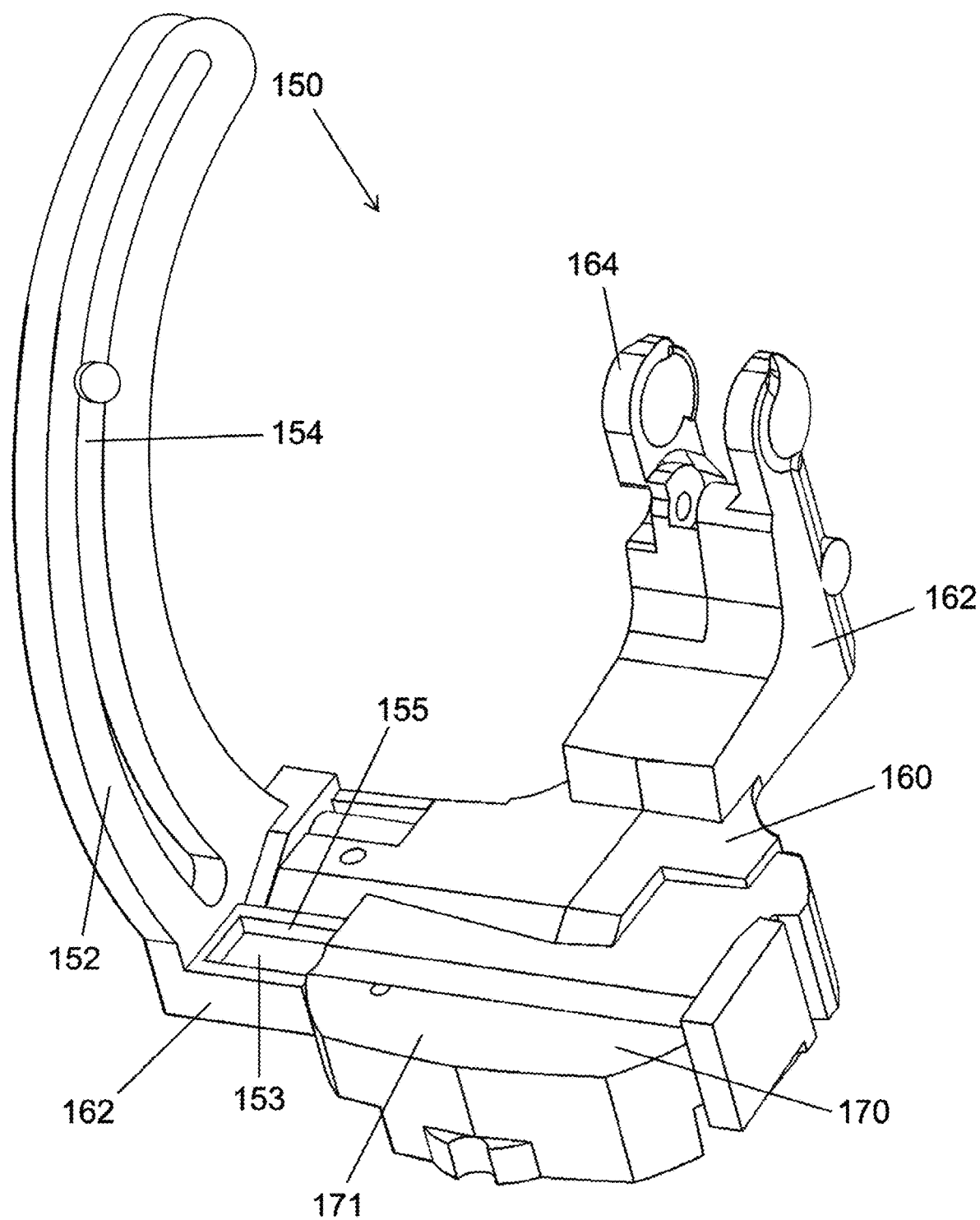
FIG. 11B is a perspective view of a support frame in which a guide member has an extended length.

FIG. 11 illustrates a perspective view of an example of the support frame 150 of the image sensor assembly 100. The support frame 150 may be made any suitable material, such as metal or plastic. The support frame 150 includes the guide member 152 and a support base 160. The guide member 152 and the support base 160 may be oriented in an "L" shape so as to receive the image sensor assembly 100. The guide member 152 and the support base 160 may be formed as one piece. Alternatively, the guide member 152 and the support base 160 may be formed as separate pieces, with the guide member 152 attached to the support base 160 by any suitable way, such as by mortise-and-tenon joints and screw fastening.

The guide member 152 may be coupled to the azimuth ring 120 by the connecting piece 140 and the connecting member 144. By way of example and without limitation, the connecting member 144 may be an L-shaped frame, as shown in FIG. 13. The connecting member 144 may include the first wing 145 and the second wing 146. The first hole 147 may be formed in the front end of the first wing 145. The first hole 147 may be configured and disposed such that the connecting piece 140 can go through so as to attach the guide member 152 to the azimuth ring 120. A second hole 148 and a third hole 149 may be formed in the second wing 146 of the connecting member 144. The second hole 148 may be configured to allow the second connection piece 139 to go through so as to connect the second wing 146 of the connecting member 144 to the back surface 133 of the connecting portion 130. The third hole 149 may be configured and disposed so as to allow the positioning rod 138 to go through so as to position the second wing 146 of the connecting member 144 relative to the back surface 133 of the connecting portion 130.

Referring back to FIG. 11, the support base 160 may include a back portion 162 and a front portion 170. As shown in FIG. 8, the front portion 170 of the support base 160 may fit over the track 31 and be thereby guided by the shape of the track as the support base 160 is moved relative to the track 31. Also, as mentioned above, the pair of gimbals 164 may be formed at the upper end of the back portion 162. The pair of gimbals 164 may be configured and disposed such that the ball joint 110 may rotatably fit between them. The pair of gimbals 164 and the ball joint 110 may share a common horizontal center line. The ball joint 110 may rotate relative to the pair of gimbals 164 so as to allow the first image sensor assembly 100 to tilt up and down.

Figure 12:
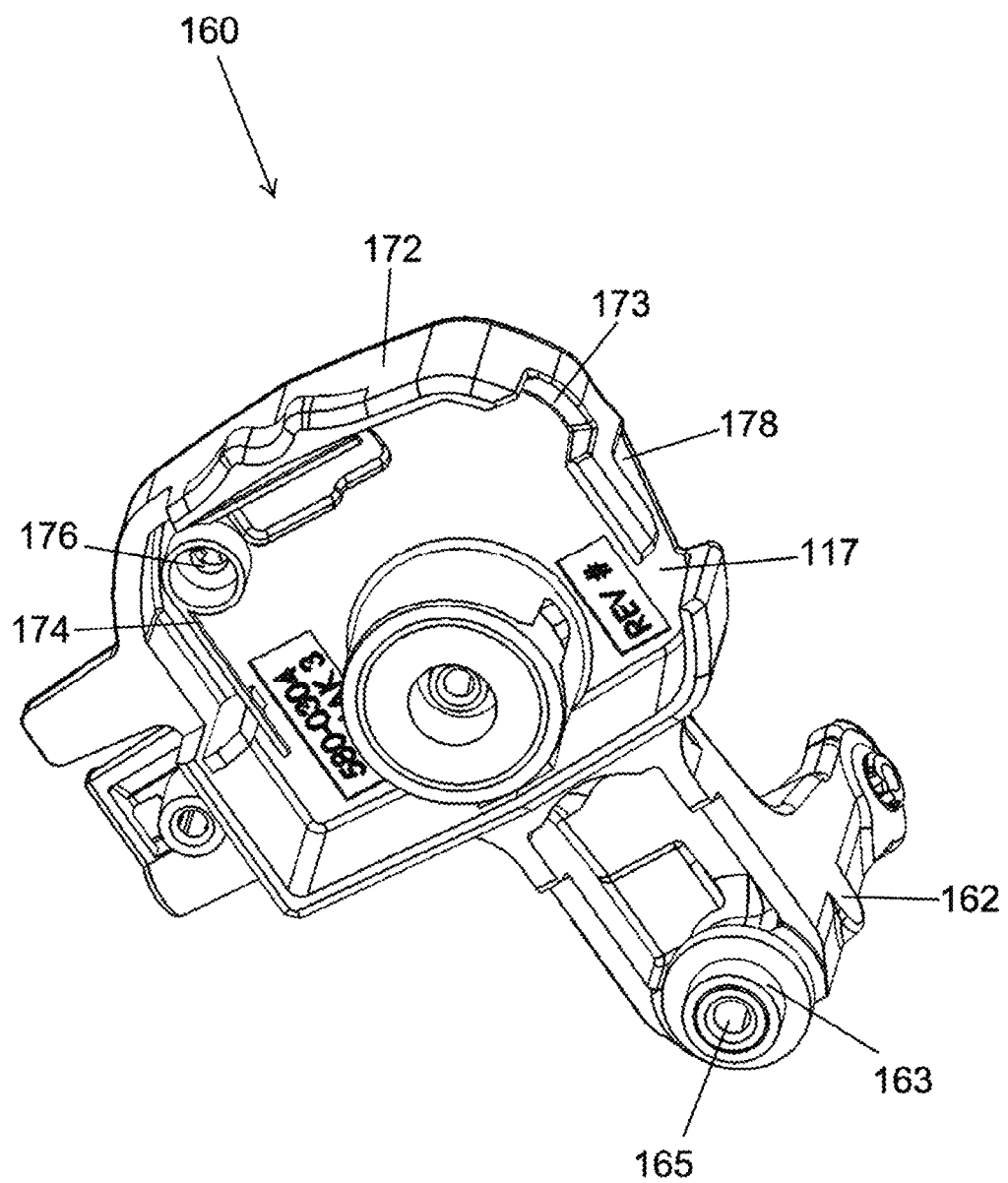
FIG. 12 is a perspective bottom view of a support base of an image sensor assembly of a multi-headed camera assembly of the present disclosure.

FIG. 12 illustrates a perspective bottom view of an example of the support base 160. A column 163 may be formed at the lower end of the back portion 162 of the support base 160. The column 163 may be configured and disposed such that it can rotatably fit into the hole 41 formed in the platform 40. The column 163 may be aligned with the ball joint 110 centered between the pair of gimbals 164, and share a common vertical center line. A threaded hole 165 may be centrally formed in the column 163. The threaded hole 165 may be used to connect the back portion 162 of the support base 160 to the bottom of the base 30 by a screw.

As illustrated in FIGS. 11 and 12, the front portion 170 of the support base 160 may move along the first long track 31 so as to accomplish pan movement of the image sensor assembly 100. The front portion 170 of the support base 160 may include a top section 171 and a side wall 172. The side wall 172 may be approximately perpendicular to the top section 171. The top section 171 may be configured to removably receive the image sensor assembly 100, as shown more particularly in FIG. 7. The image sensor assembly 100 may sit on the top section 171 when the image sensor assembly 100 is positioned at the horizon. The image sensor assembly 100 may move away from the top section 171 when the image sensor assembly 100 tilts upward from the horizon. As shown more particular in FIGS. 6, 7 and 8, the side wall 172 of the front portion 170 may rest on the top surface of the base 30 so that the front portion 170 may move along the first long track 31 and accomplish pan movement of the image sensor assembly 100.

As shown in FIG. 12, a first opening 173 may be formed in one side of the side wall 172 and a second opening 174 may be formed in the opposite side of the side wall 172. Both the first opening 173 and the second opening 174 may have an inverted U shape that matches the shape of the first long track 31. The first opening 173 and the second opening 174 may be configured and disposed so as to allow the first long track 31 to go through the bottom of the front portion 170, thereby enabling the support base 160 to move along the first long track 31 and accomplish pan movement of the image sensor assembly 100.

Figure 14A:
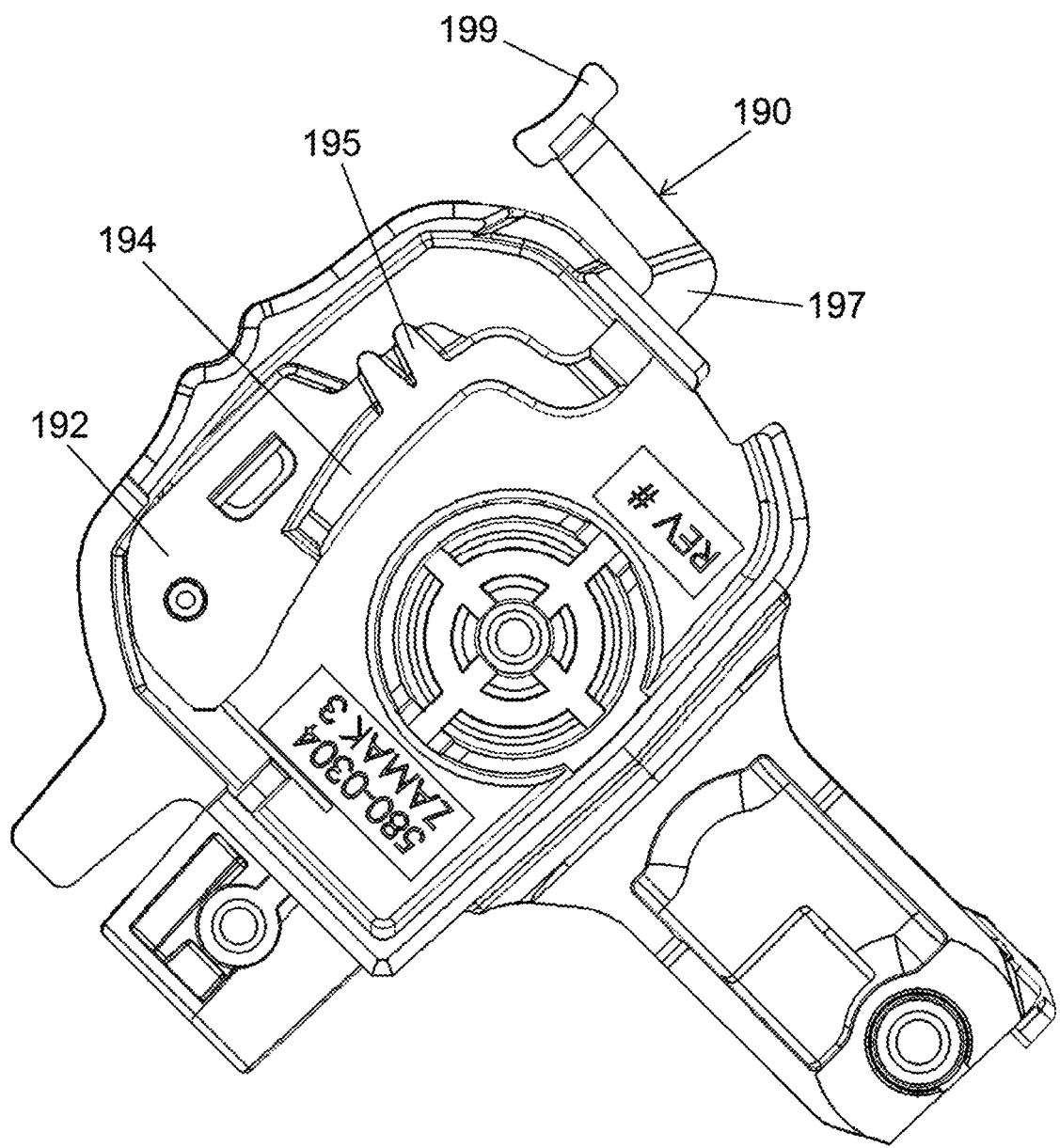
FIG. 14A is a bottom view of a support frame with a release member in a forwardly disposed locked position in accordance with the present disclosure.
Figure 14B:
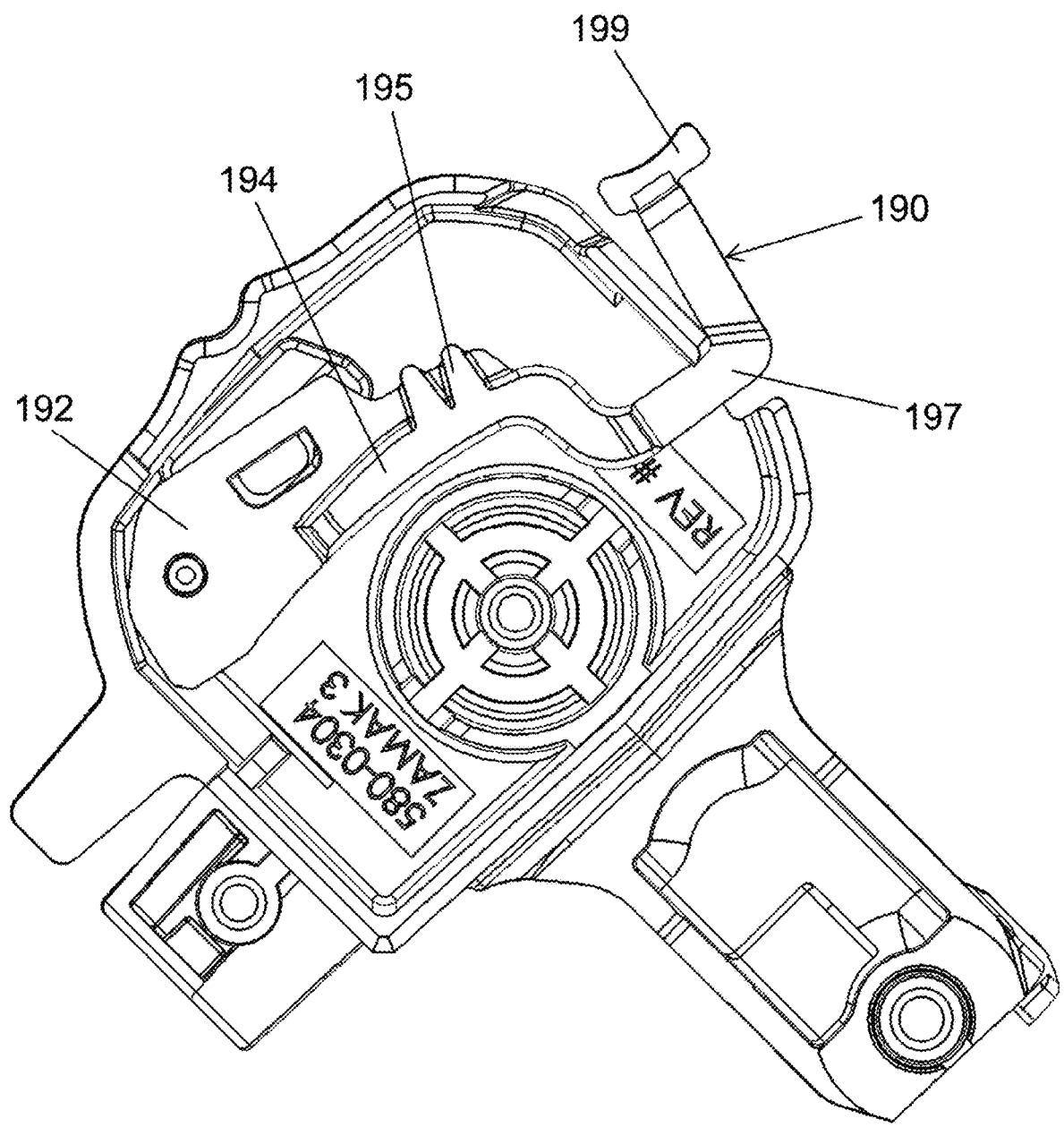
FIG. 14B is a bottom view of a support frame with a release member in a backwardly disposed release position in accordance with the present disclosure.

As illustrated in FIGS. 12, 14A, 14B, and 15, the front portion 170 of the support base 160 may further include a second connecting member 176, a third opening 177, and a receptacle 178. The second connecting member 176 may be provided on the inner surface of the top section 171 and positioned at the left-front corner of the front portion 170. The second connecting member 176 may be used to rotatably connect a pivot section 192 of a release member 190 to the support base 160. In an embodiment, the second connecting member 176 may be a hole cut through the top section 171. The through hole 176 may be used to receive a spring 193 coupled to the pivot section 192 of the release member 190. By way of example and without limitation, the spring 193 may be a torsion spring. The third opening 177 may be formed in the right-back segment of the side wall 172. The third opening 177 may be configured and disposed so as to allow a handle section 197 of the release member 190 to enter or exit from the receptacle 178. The receptacle 178 may be configured and disposed so as to receive the handle section 197 and allow the handle section 197 to move between a backwardly disposed position and a forwardly disposed position, as illustrated in FIGS. 14A and 14B.

Referring to FIGS. 14A and 14B, the release member 190 may include the pivot section 192, a central section 194, and the handle section 197. The pivot section 192 may be pivotally attached to the bottom of the support base 160 by any suitable way. The central section 194 and the handle section 197 of the release member 190 is movable between a backwardly disposed unlocked position, shown in FIG. 14B, and a forwardly disposed locked position, shown in FIG. 14A, so as to allow the support base 160 to move along the first long track 31 or lock the support base 160 at a desired position. A plurality of teeth 195 may be formed on the central section 194. While two teeth are illustrated in FIGS. 14A and 14B, the number of teeth 195 is not limited to two, and it may be any suitable number, such as three and four. The teeth 195 may be configured and disposed so as to be capable of engaging with the track teeth 36 of the first long track 31.

Figure 15:
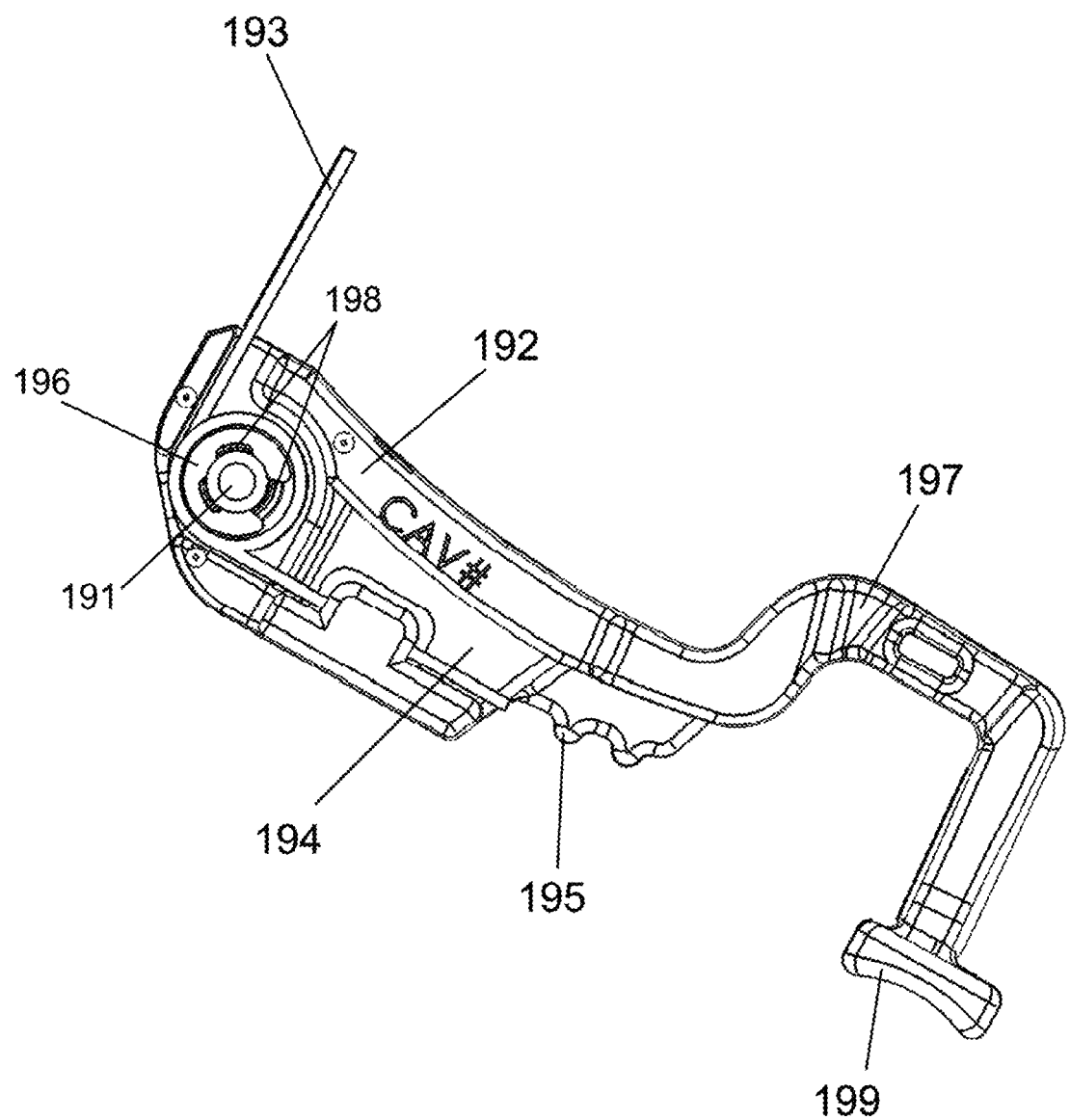
FIG. 15 is a perspective view of a release member including a spring in accordance with the present disclosure.

In an embodiment, as shown in FIG. 15, the pivot section 192 may include a shaft 191. The shaft 191 may be configured and disposed so as to be coupled to the spring 193 that may fit into the through hole 176 of the top section 171. A plurality of projections 198, such as three ones, may be formed around the shaft 191. The projections 198 may be configured and disposed so as to engage with a retainer clip 196 that may further engage with the spring 193. The spring 193 may be twisted when a backwardly directed force is applied to the end 199 of the handle section 197 in order to disengage the teeth 195 of the release member 190 from the track teeth 36 of the first long track 31 and pan the image sensor assembly 100 along the first long track 31. When the first image sensor assembly 100 pans to a desired position, a user only needs to remove the backwardly directed force on the end 199 of the handle section 197, and the release member 190 will automatically move forward under the torsion force of the spring 193 so that the teeth 195 of the release member 190 reengage with the track teeth 36 of the first long track 31 to lock the first set of image sensor assembly 100 at the desired position. In another embodiment not further illustrated, a screw with a long rod may be used to pivotally attach the pivot section 192 of the release member 190 to the support base 160 by screwing into two treaded holes which are formed in the second connecting member 176 of the support base 160 and in the pivot section 192 of the release member 190, respectively.

While certain embodiments have been described, these embodiments have been presented by way of example only, and are not intended to limit the scope of the inventions disclosed herein. Thus, nothing in the foregoing description is intended to imply that any particular feature, characteristic, or step is necessary or indispensable. Indeed, the present disclosure described herein may be embodied in a variety of other forms; furthermore, various omissions, substitutions, and changes in the form of the embodiments described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A multi-headed camera assembly, comprising:
   a base;
   a plurality of tracks positioned on the base;
   a plurality of support frames;
   a plurality of image sensor assemblies, each image sensor assembly comprising an inner housing, a lens assembly, and a support mechanism configured to allow a quick and efficient assembly of the lens assembly within the housing, wherein each image sensor assembly is removably coupled to the base and a separate track among the plurality of tracks by a separate support frame among the plurality of support frames, each support frame including:
      a guide member for guiding tilt movement of each image sensor assembly, and
      a support base movably coupled to each of the separate tracks so as to enable pan movement of each image sensor assembly; and
   an outer housing for enclosing each of the base, the plurality of tracks, the plurality of support frames, and the plurality of image sensor assemblies.

2. The assembly of claim 1, further comprising a surface mount mechanism, an in-ceiling mount mechanism, or a pendant mount mechanism.

3. The assembly of claim 1, wherein a first set of tracks among the plurality of tracks is longer than a second set of tracks among the plurality of tracks.

4. The assembly of claim 1, wherein each support frame further includes a release member for releasing the support base to allow the support base to move along a corresponding track and locking the support base at a desired position on the corresponding track.

5. The assembly of claim 4, wherein the release member is configured to move between a backwardly disposed release position and a forwardly disposed locked position.

6. The assembly of claim 5, wherein the release member includes a plurality of first teeth configured to engage with a plurality of second teeth of the corresponding track.

7. The assembly of claim 1, wherein the guide member comprises a guide groove for guiding tilt movement of a corresponding image sensor assembly.

8. The assembly of claim 7, wherein the support frame further includes a first connecting member capable of movably connecting the corresponding image sensor assembly to the guide member.

9. The assembly of claim 8, wherein the support frame further includes a second connecting member for connecting the first connecting member and the guide member to the corresponding image sensor assembly.

10. The assembly of claim 9, wherein the support frame further comprises a pair of gimbals, the pair of gimbals configured to rotatably receive a ball joint of the corresponding image sensor assembly.

11. The assembly of claim 1, wherein at least an image sensor assembly among the plurality of image sensor assemblies tilts up to 90° from the horizon.

12. An image sensor assembly amongst a plurality of image sensor assemblies in a multi-headed camera assembly, comprising:
   a housing cover for each image sensor assembly amongst the plurality of image sensor assemblies, the housing cover configured to receive a lens assembly; and
   a separate support mechanism for each image sensor assembly amongst the plurality of image sensor assemblies, the support mechanism configured to allow a quick and efficient assembly of the lens assembly within the housing cover, wherein the housing cover comprises a front cover, a ring member, a middle cover, and a back cover, the ring member rotatably attached to the back end of the front cover and the front end of the middle cover, the back cover coupled to the middle cover by connecting to the support mechanism.

13. The assembly of claim 12, wherein the support mechanism is configured to rotatably receive the lens assembly, and the support mechanism is coupled to the front cover, the middle cover, and the back cover.

14. The assembly of claim 12, further comprising:
   a self-applying pressure mechanism configured to hold the lens assembly in the support mechanism.

15. A method of adjusting an image sensor apparatus of a multi-headed camera assembly, comprising:
   panning an image sensor apparatus among a plurality of image sensor apparatus along a track among a plurality of tracks, further comprising:
      disengaging a release member of a support frame from the track,
      moving the image sensor apparatus along the track to a desired position, and
      locking the image sensor apparatus at the desired position by engaging the release member with the track; and
   tilting the image sensor apparatus along a guide member of the support frame, further comprising:
      loosening a connecting member of the support frame from the image sensor apparatus,
      moving the image sensor apparatus along a guide groove formed in the guide member to a desired position, and
      locking the image sensor apparatus at the desired position by tightening the connecting member to the image sensor apparatus.

* * * * *